United States Patent [19]

Inoue

[11] Patent Number: 5,694,543
[45] Date of Patent: Dec. 2, 1997

[54] POLLING SUBSTITUTION SYSTEM FOR PERFORMING POLLING COMMUNICATIONS WITHIN A COMPUTER NETWORK

[75] Inventor: Yoshinobu Inoue, Kawasaki, Japan

[73] Assignee: Fujitsu Limited, Kanagawa, Japan

[21] Appl. No.: 438,893

[22] Filed: May 10, 1995

[30] Foreign Application Priority Data

Jun. 21, 1994 [JP] Japan ................................. 6-138539

[51] Int. Cl.⁶ ............................ G06F 13/00; G06F 13/22
[52] U.S. Cl. ................. 395/200.01; 395/289; 395/866; 370/449
[58] Field of Search ............... 395/200.01, 200.08, 395/200.11, 800, 280, 182.02, 700, 289; 370/95.2, 85.1, 94.1, 60, 85.8, 346, 349, 449; 340/825.08

[56] References Cited

U.S. PATENT DOCUMENTS

| | | | |
|---|---|---|---|
| 4,584,680 | 4/1986 | Carter et al. | 370/85.8 |
| 4,924,457 | 5/1990 | Shimizu | 370/56 |
| 4,924,461 | 5/1990 | Amemiya et al. | 370/95.2 |
| 5,170,394 | 12/1992 | Biber et al. | 370/94.1 |
| 5,297,144 | 3/1994 | Gilbert et al. | 370/95.2 |
| 5,341,499 | 8/1994 | Doragh | 395/700 |
| 5,469,436 | 11/1995 | Brandner et al. | 370/85.2 |
| 5,485,464 | 1/1996 | Strodtbeck et al. | 370/95.2 |

*Primary Examiner*—Gopal C. Ray
*Attorney, Agent, or Firm*—Helfgott & Karas, P.C.

[57] ABSTRACT

A substitution response section processes a start, stop, restart, and end of a substitution response to a polling request from a server unit on the basis of an exchange of a sync control message between the substitution response section and a substitution request section on a client unit side via a network. The substitution request section processes a start, stop, restart, and end of a polling substitution request for the client unit on the basis of an exchange of the sync control message between the substitution request section and the substitution response section via the network.

21 Claims, 35 Drawing Sheets

FIG. 6

| POLLING REQUEST APPARATUS IDENTIFIER | POLLING RESPONSE APPARATUS IDENTIFIER | SUBSTITUTION REQUEST OPERATING MODE | TIMER | | | | | |
|---|---|---|---|---|---|---|---|---|
| | | | T0 | T1 | | T3 | T4 | T5 |
| SERVER 10 | CLIENT 12-3 | REQ2 | 02 | 02 | | 00 | 00 | 15 |
| | | | | | | | | |
| | | | | | | | | |
| | | | | | | | | |

| OPERATING STATE | SYMBOL | CONTENTS |
|---|---|---|
| SUBSTITUTION RESPONSE INOPERATING MODE | RES1 | STATE IN WHICH NO POLLING REQUEST IS RECEIVED AND NO SUBSTITUTION RESPONSE IS PERFORMED |
| SUBSTITUTION RESPONSE MODE | RES2 | STATE IN WHICH POLLING REQUEST IS RECEIVED AND SUBSTITUTION RESPONSE IS PERFORMED |
| SUBSTITUTION RESPONSE STOP MODE | RES3 | STATE IN WHICH POLLING REQUEST IS RECEIVED AND NO SUBSTITUTION RESPONSE IS PERFORMED |
| SUBSTITUTION RESPONSE FAULT MODE | RES4 | STATE IN WHICH SYNCHRONIZATION CANNOT BE OBTAINED ON PROTOCOL WITH SUBSTITUTION REQUESTING SECTION BECAUSE OF LINE FAULT OR THE LIKE |

F I G. 8

| OPERATING STATE | SYMBOL | CONTENTS |
|---|---|---|
| SUBSTITUTION REQUEST INOPERATING MODE | REQ1 | STATE IN WHICH SUBSTITUTION REQUEST OF POLLING IS NOT TRANSMITTED |
| SUBSTITUTION REQUEST MODE | REQ2 | STATE IN WHICH SUBSTITUTION REQUEST OF POLLING IS PERIODICALLY TRANSMITTED |
| SUBSTITUTION REQUEST RETRANSMISSION MODE (NO-RESPONSE RECEPTION MODE) | REQ3 | MODE IN WHICH POLLING RESPONSE RECEPTION WAITING TIMER T1 HAS TIMED OUT IN RESPONSE TO SUBSTITUTION REQUEST OF POLLING. SUBSTITUTION REQUEST OF POLLING IS RETRANSMITTED. THIS MODE IS HELD UNTIL POLLING RESPONSE IS OBTAINED OR UNTIL THE END OF OPERATION OF CLIENT UNIT IS JUDGED. |
| SUBSTITUTION REQUEST FAULT MODE | REQ4 | STATE IN WHICH SYNCHRONIZATION CANNOT BE OBTAINED ON PROTOCOL WITH SUBSTITUTION RESPONSE SECTION BECAUSE OF LINE FAULT OR THE LIKE |

FIG. 9

| KIND | SYMBOL | CONTENTS |
|---|---|---|
| SUBSTITUTION REQUEST START MESSAGE | MES1 | MESSAGE SUCH THAT THE SUBSTITUTION RESPONSE SECTION INSTRUCTS THE SUBSTITUTION REQUEST SECTION TO ENTER SUBSTITUTION REQUEST MODE RES2 |
| SUBSTITUTION RESPONSE STOP MESSAGE | MES2 | MESSAGE SUCH THAT THE SUBSTITUTION REQUEST SECTION INSTRUCTS THE SUBSTITUTION RESPONSE SECTION TO ENTER SUBSTITUTION RESPONSE STOP MODE RES3 |
| SUBSTITUTION RESPONSE RESTART MESSAGE | MES3 | MESSAGE SUCH THAT THE SUBSTITUTION REQUEST SECTION INSTRUCTS THE SUBSTITUTION RESPONSE SECTION TO ENTER SUBSTITUTION RESPONSE MODE RES2 |
| SUBSTITUTION REQUEST END MESSAGE | MES4 | MESSAGE SUCH THAT THE SUBSTITUTION RESPONSE SECTION INSTRUCTS THE SUBSTITUTION REQUEST SECTION TO ENTER SUBSTITUTION REQUEST INOPERATING MODE REQ1 |
| SUBSTITUTION RESPONSE END MESSAGE | MES5 | MESSAGE SUCH THAT THE SUBSTITUTION REQUEST SECTION INSTRUCTS THE SUBSTITUTION RESPONSE SECTION TO ENTER SUBSTITUTION RESPONSE INOPERATING MODE RES1 |
| RESET REQUEST MESSAGE | MES6 | MESSAGE SUCH THAT THE SUBSTITUTION RESPONSE SECTION /SUBSTITUTION REQUEST SECTION INSTRUCTS THE PARTNER TO FINISH SUBSTITUTING PROCESSES REGARDING ALL POLLINGS AND TO ENTER SUBSTITUTION REQUEST INOPERATING MODE REQ1/SUBSTITUTION RESPONSE INOPERATING MODE RES1 |
| RESET ACKNOWLEDGE MESSAGE | MES7 | MESSAGE OF ACKNOWLEDGE RESPONSE TO INFORM THE PARTNER OF THE FACT THAT RESET REQUEST MESSAGE MES6 WAS RECEIVED AND SUBSTITUTION REQUEST INOPERATING MODE REQ1/SUBSTITUTION RESPONSE INOPERATING MODE RES1 WAS SET |

FIG. 12

| KIND OF TIMER | SYMBOL | CONTENTS |
|---|---|---|
| POLLING SUBSTITUTION REQUEST TRANSMISSION TIMER | T0 | STARTS WHEN TRANSMITTING POLLING SUBSTITUTION REQUEST OF SUBSTITUTION REQUEST SECTION AFTER THAT, OPERATIONS TO TRANSMIT POLLING SUBSTITUTION REQUEST AND TO RESTART ARE REPEATED EVERY TIME-UP. |
| POLLING RESPONSE RECEPTION WAITING TIMER | T1 | TIMER TO MONITOR RECEPTION WAITING TIME OF POLLING RESPONSE FOR SUBSTITUTION REQUEST OF POLLING TRANSMITTED BY SUBSTITUTION REQUEST SECTION. WHEN TIMER TIMES UP, OPERATING STATE IS SWITCHED TO REQ2 AND SUBSTITUTION RESPONSE STOP MESSAGE MES2 IS TRANSMITTED TO SUBSTITUTION RESPONSE SECTION, THEREBY INSTRUCTING SO AS TO ENTER SUBSTITUTION RESPONSE STOP MODE RES3 |
| POLLING REQUEST RECEPTION TIMER | T2 | STARTS/RESTARTS WHEN SUBSTITUTION RESPONSE SECTION RECEIVES POLLING REQUEST. WHEN TIMER TIMES UP, IT IS REGARDED THAT POLLING REQUEST WAS FINISHED. SUBSTITUTION REQUEST END MESSAGE MES4 IS TRANSMITTED |
| POLLING RESPONSE RECEPTION TIMER | T3 | STARTS/RESTARTS WHEN RECEIVING POLLING RESPONSE OF SUBSTITUTION REQUEST OF SUBSTITUTION REQUEST SECTION. WHEN TIMER TIMES UP, IT IS REGARDED THAT CLIENT STOPS. SUBSTITUTION RESPONSE END MESSAGE MES5 IS TRANSMITTED TO SUBSTITUTION RESPONSE SECTION, THEREBY INSTRUCTING TO FINISH |
| RESET RESPONSE WAITING TIMER | T4 | TIMER WHICH STARTS WHEN SUBSTITUTION RESPONSE SECTION/SUBSTITUTION REQUEST SECTION TRANSMITS RESET REQUEST MESSAGE MES6 TO PARTNER AND WAITS FOR RECEPTION OF RESET ACKNOWLEDGE MESSAGE MES7. WHEN TIMER TIMES UP, RESET REQUEST MESSAGE MES6 IS RETRANSMITTED AND TIMER RESTARTS |
| ABNORMAL SUBSTITUTION MONITORING TIMER | T5 | TIMER TO JUDGE ABNORMALITY SUCH THAT SUBSTITUTION RESPONSE/SUBSTITUTION REQUEST CONTINUES FOR A LONG TIME. WHEN TIMER TIMES UP, RESET REQUEST MESSAGE MES6 IS TRANSMITTED TO PARTNER (IN THIS INSTANCE, T4 STARTS) |

FIG. 33

| KIND | SYMBOL | CONTENTS |
|------|--------|----------|
| SUBSTITUTION REQUEST START ACKNOWLEDGE MESSAGE | MES8 | MESSAGE OF ACKNOWLEDGE RESPONSE TO INFORM THE PARTNER OF THE FACT THAT SUBSTITUTION REQUEST START MESSAGE MES1 WAS RECEIVED AND SUBSTITUTION REQUEST MODE REQ2 WAS SET |
| SUBSTITUTION RESPONSE STOP ACKNOWLEDGE MESSAGE | MES9 | MESSAGE OF ACKNOWLEDGE RESPONSE TO INFORM THE PARTNER OF THE FACT THAT SUBSTITUTION RESPONSE STOP MESSAGE MES3 WAS RECEIVED AND SUBSTITUTION RESPONSE STOP MODE RES3 WAS SET |
| SUBSTITUTION REQUEST RESTART ACKNOWLEDGE MESSAGE | MES10 | MESSAGE OF ACKNOWLEDGE RESPONSE TO INFORM THE PARTNER OF THE FACT THAT SUBSTITUTION RESPONSE RESTART MESSAGE MES3 WAS RECEIVED AND SUBSTITUTION RESPONSE MODE RES2 WAS SET |
| SUBSTITUTION REQUEST END ACKNOWLEDGE MESSAGE | MES11 | MESSAGE OF ACKNOWLEDGE RESPONSE TO INFORM THE PARTNER OF THE FACT THAT SUBSTITUTION REQUEST END MESSAGE MES4 WAS RECEIVED AND SUBSTITUTION REQUEST INOPERATING MODE REQ1 WAS SET |
| SUBSTITUTION RESPONSE END ACKNOWLEDGE MESSAGE | MES12 | MESSAGE OF ACKNOWLEDGE RESPONSE TO INFORM THE PARTNER OF THE FACT THAT SUBSTITUTION RESPONSE END MESSAGE MES5 WAS RECEIVED AND SUBSTITUTION RESPONSE INOPERATING MODE RES1 WAS SET |

POLLING SUBSTITUTION SYSTEM FOR PERFORMING POLLING COMMUNICATIONS WITHIN A COMPUTER NETWORK

BACKGROUND OF THE INVENTION

The present invention relates to a polling substitution system of a computer network to execute a periodic polling communication for operation confirmation between two units via the network and, more particularly, to a polling substitution system (also referred to as a polling proxy system) for executing a substitution response to a polling requesting side and a substitution request to a polling request destination so as not to directly supply polling data onto the network.

In a client server system using a computer network, there is used a style such that the client establishes a communication connection via the network between the client and a server and assures and uses a predetermined amount of information resources on the server, for example, a CPU processing time, a memory, a disk, and the like for himself. Such an establishment of the communication connection and a holding of the resources are executed by a communication procedure between the client and the server. However, in the case where a power source is turned off before the client executes a shut-off procedure of the communication connection or the operation stops due to a failure, the resources held on the server are not used and are unnecessarily occupied. The resources on the server are finite. When a case where the resources are unnecessarily occupied is presumed, it is desirable that the server side can independently release the holding of the unnecessary resources. To enable the server side to perform such a release of the resources, a polling function to confirm the operation of the client is introduced.

According to the polling function, the server periodically transmits a polling request message to a client having a possibility of an inoperating state such that there is no access to the server for a predetermined time irrespective of a fact that the connection has already been established. In the case where a polling response message is not sent from the client a predetermined number of times or more in response to such continuous polling request messages, it is regarded that the client stops the operation, so that the corresponding resource on the server side is released. When the client returns a polling response message for the polling request message that is periodically transmitted by the server side, it is regarded that the client normally operates, so that the resources held on the server are continuously held.

On the other hand, in recent years, a wide area network (WAN) such as an ISDN or the like which can be used as a computer network is made variable and networks having various charging forms have been put into practical use. Those charging forms of the networks have a feature such that a charging amount is smallest with respect to a specific data transmission pattern (data size and transmission interval). For example, the line exchange of the time charge has a data transmission pattern such that a data transfer is concentratedly executed for a predetermined time and the line is never used for the other times. It is most advantageous on charging as compared with an exclusive-use line for a packet exchange or a fixed amount charge of a packet charge as another charging form.

As a communication form such as mutual connection between the local area network (LAN) and the wide area network (WAN) or mutual connection of a plurality of wide area networks of different charging forms is widespread, there occurs a case where it is disadvantageous on a charging form if a data transmission pattern which doesn't cause any problem on charging in a certain local area network and a wide area network is relayed onto another wide area network.

Although the transmission pattern of data doesn't largely change for an interval from the transmitting side of the data to the destination of the data, the charging form of the network clearly changes each time the kind of network is changed in the way of a communication path. Therefore, it is effective to take a countermeasure such that for a certain data transmission pattern, the data transmission pattern is changed on only a network that is uncongenial with the data transmission pattern or the data transmission pattern is never transmitted if possible or the like.

However, in case of the polling communication which is periodically executed by the server by using the computer network in order to confirm the operation of the client, the transmission pattern of the polling data can be said to be a typical example that is uncongenial with the charging form of the network. Even in case of the wide area network of the line exchange which is charged on the basis of the communication time or the like, the polling communication is also disadvantageous even as compared with not only the local area network without charging but also the packet exchange or exclusive-use line.

SUMMARY OF THE INVENTION

It is, therefore, an object of the invention to provide a polling substitution system (or polling proxy system) in which a polling substituting function is provided for communication control apparatuses on both sides of a network to which the user doesn't want to transmit polling data, a synchronous control of the start, stop, restart, end, and the like of a polling substitution are suppressed to a necessary minimum limit with respect to the communication via the network, and polling data is not directly supplied to the network, thereby allowing an advantage handling on charging to be accepted.

According to a system of the invention, a shared unit and a processing unit are connected through a network. The shared unit is, for instance, a server unit and holds information resources and assures the use of the relevant resource in accordance with a request from the outside. Further, in the case where a polling request to confirm the operation is transmitted to a using side of the information resources and no response is obtained, the server unit releases the resources held for the using side.

The processing unit is, for example, a client unit and uses the information resources of the server unit via the network. The server unit is connected to the network by a first communication control section and establishes a communication connection with another unit including the client unit on the basis of a communication request. The client unit is connected to the network by a second communication control section and establishes a communication connection with another unit including the server unit on the basis of the communication request.

A substitution response section is provided for the first communication control section and processes a substitution response for a polling request from the server unit on the basis of an exchange of a sync control message between the substitution response section and a substitution request section in the second communication control section on the client unit side via the network.

The substitution request section is provided for the second communication control section and processes a polling substitution request for the client unit on the basis of an exchange of the sync control message between the substitution request section and the substitution response section via the network.

When starting the polling substituting process, when a polling request is received from the server unit, the substitution response section first transmits a substitution request start message to the substitution request section via the network and starts the transmission of the polling substitution response for the server unit. When a substitution request start message is received from the substitution response section, the substitution request section starts the transmission of the polling substitution request to the client unit. When the polling substitution is started, the substitution response section returns a polling substitution response each time a polling request is received from the server unit. So long as the polling response is received from the client unit, the substitution request section periodically transmits the polling substitution request.

The substitution request section repeats processes such that an elapsed time after the transmission of the polling substitution request to the processing unit is monitored and, in the case where the monitor time exceeds a predetermined time, a polling substitution request is again transmitted and the time is monitored.

To temporarily stop the polling substitution, the substitution request section monitors an elapsed time from the transmission of the polling substitution request to the reception of the polling response from the client unit. When the monitor time exceeds a predetermined time, the substitution request section transmits a substitution response stop message to the substitution response section via the network, thereby temporarily stopping the transmission of the substitution response for the polling request from the server unit.

When restarting the polling substitution after it was temporarily stopped, after completion of the substitution response stop message, when the polling response is received from the client unit, the substitution request section transmits a substitution response restart message to the substitution response section via the network, thereby restarting the response to the polling request from the server unit.

When the polling substitution is finished, the substitution response section monitors a repetition time of the polling request from the server unit and, when the monitor time exceeds a predetermined time, it is judged that the polling request stops, and a substitution request end message is transmitted to the substitution request section via the network, thereby finishing the polling substitution request to the client unit.

The substitution request section monitors a time of the polling response from the client unit for the polling substitution request and, when the monitor time exceeds a predetermined time, it is judged that the operation of the client unit is finished, the transmission of the polling substitution request to the client unit is stopped, and a substitution response end message is transmitted to the substitution response section via the network.

In a state in which the substitution response to the polling request from the server unit is temporarily stopped, when the substitution response end message is received via the network, the substitution response section finishes the polling substituting process.

Further, a resetting operation is executed for a synchronization deviation which occurs due to a line fault of the network. When a fault recovery is detected after the occurrence of the fault of the network was detected, the substitution response section transmits a reset request message to the substitution request section via the network.

When the reset request message is received from the substitution response section via the network, after the substitution requesting operation was initialized, the substitution request section transmits a reset acknowledge message to the substitution response section via the network, thereby initializing the substitution responding operation of the substitution response section. The substitution response section monitors an elapsed time from the transmission of a reset request message to the reception of the reset acknowledge message and, when the monitor time exceeds a predetermined time, the reset request message is again transmitted.

Even when the fault recovery is detected after the occurrence of a fault of the network was detected, the substitution request section on the client side similarly transmits the reset request message to the substitution response section and initializes the substitution responding operation of the substitution response section and, after that, transmits a reset acknowledge message to the substitution request section via the network, thereby initializing the substitution requesting operation. In this instance, an elapsed time from the transmission of the reset request message to the reception of the reset acknowledge message is monitored and, when the monitor time exceeds a predetermined time, the reset request message is again transmitted.

Further, as a process for finishing the polling substitution, the substitution response section monitors a time of the polling request which is repetitively executed from the server unit to a specific partner side and, when the monitor time exceeds an abnormally long predetermined time, the reset request message is transmitted to the substitution request section via the network, the substitution requesting operation is initialized, and after that, the reset acknowledge message is transmitted to the substitution response section via the network, thereby initializing the substitution responding operation of the substitution response section.

The substitution request section can also transmit an acknowledge message for the reception of each of the substitution request start message and substitution request end message. The substitution response section can also transmit an acknowledge message for the reception of each of the substitution response stop message, substitution response restart message, and substitution response end message.

The network is a network for charging in accordance with a use degree of communication. As a system configuration, the first communication control section having the substitution response section connects a network for no-charge or fixed charge such as a local area network or the like having the server unit to another network, and the second communication control section having the substitution request section connects another local area network having the client unit to the network.

It is also possible to use a system configuration in a manner such that the first communication control section having the substitution response section connects the first network for no-charge or fixed charge having the shared unit to the second network for no-charge or fixed charge, the third communication control section connects the second network to the foregoing network for charging in accordance with a use degree of communication, the fourth communication control section connects the network to the third network for no-charge or fixed charge, and further the second communication control section having the substitution request section connects the other fourth network for no-charge or fixed charge having a processing unit to the third network.

Moreover, the server unit and client unit can be also connected via a plurality of networks. In this case, the first communication control section having the substitution response section is provided on the server unit side of each network and the second communication control section having the substitution request section is provided on the processing unit side and is connected to the first communication control section.

According to such a polling substitution system of the invention, the following advantages are obtained. First, the start message is sent through the network on the basis of the polling request from the server and the communication control apparatus on the client side of the network can start the substitution responding process for the client in response to the polling request synchronously with the substitution requesting process for the server. When the polling response is not sent from the client during the process of the substitution request, the stop message is transmitted through the network, and the substitution response to the server can be stopped synchronously with the stop of the response of the client. Further, when the polling response from the client is restarted after the stop of the substitution response, the restart message is sent via the network, and the polling substitution response to the server can be restarted synchronously with the restart of the response of the client. By the transmission of the end message via the network, the substitution requesting process for the server and the substitution responding process for the client can be synchronously finished. Further, in the case where a line fault or the like occurs in the network and the message communication cannot be performed and an asynchronous state occurs, the operations of the substitution response for the server and the substitution request for the client are initialized and can be forcedly synchronized by the communication of the reset message in association with the fault recovery.

The above and other objects, features, and advantages of the present invention will become more apparent from the following detailed description with reference to the drawings.

BRIEF DESCRIPTION OF THE DRAWINGS

FIG. 6 is an explanatory diagram of a management table for substitution request;

FIG. 7 is an explanatory diagram of an operating mode of a substitution response apparatus on the server side;

FIG. 8 is an explanatory diagram of an operating mode of a substitution request apparatus on the client side;

FIG. 9 is an explanatory diagram of a message for sync control which is communicated through a network;

FIG. 12 is a functional explanatory diagram of timers which are used for a substituting process;

FIG. 33 is an explanatory diagram of response messages which are additionally provided;

DETAILED DESCRIPTION OF THE PREFERRED EMBODIMENTS

[System Configuration]

Figure 1:
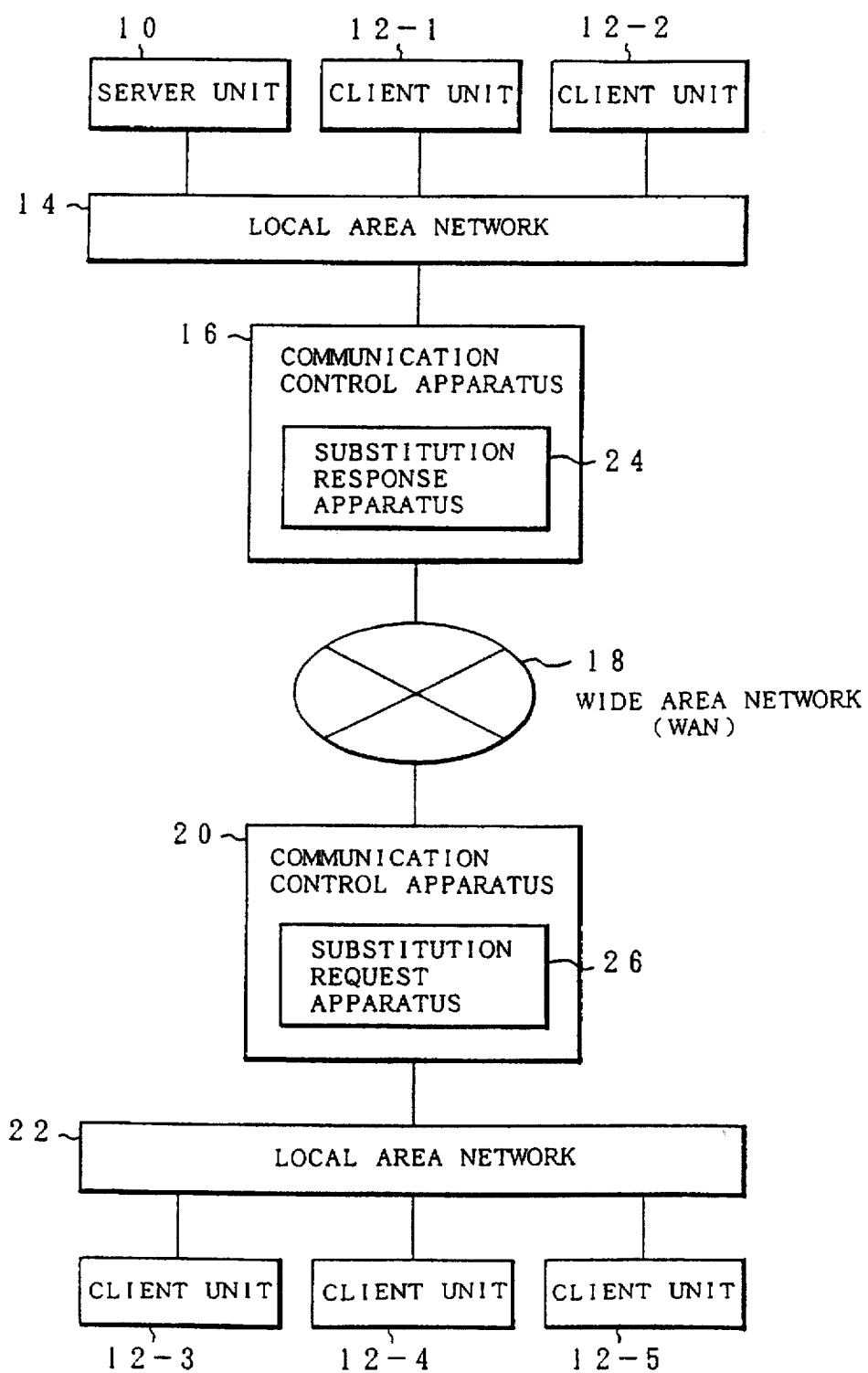
FIG. 1 is a block diagram of a system configuration of the invention.

FIG. 1 shows a server client system using a computer network in which a polling substitution system (also referred to as a polling proxy system) of the invention is used. A server unit 10 is connected to client units 12-1 and 12-2 through a local area network 14. The local area network 14 having the server unit 10 is connected to a wide area network 18 through a communication control apparatus 16. Another local area network 22 is connected to the wide area network 18 through a communication control apparatus 20. Client units 12-3, 12-4, and 12-5 which access to the server unit 10 of the local area network 14 through the wide area network 18 are connected to the local area network 22.

The server unit 10 has information resources, for example, a CPU processing time, a memory, a disk, and the like which can be used by the client units 12-1 to 12-5. The information resources can be used by requests from the client units 12-1 to 12-5. That is, the client units 12-1 to 12-5 request to use the information resources by establishing a communication connection based on a log-in operation to the server unit 10. In response to a request from the client, the server unit 10 assures the requested resource and enables such a resource to be used for an access from the client. Since there is a limit in the resources of the server unit 10, in the case where there is a doubt of no operation such as no access from the client over a predetermined time or the like although, the communication connection has been established, the server unit 10 periodically transmits a polling request message to the relevant client unit.

The server unit 10 can directly send the polling request message to the client units 12-1 and 12-2 connected to the local area network 14. In the case where the client units 12-1 and 12-2 normally operate, the client units 12-1 and 12-2 return a polling response message upon receipt of the polling request message from the server unit 10. In the case where the client units 12-1 and 12-2 do not operate, no polling response message is obtained. When there is no response for successive polling request messages of a predetermined number of times or more, the server unit 10 regards that the client unit stops the operation and forcedly opens the corresponding information resource.

The polling request message from the server unit 10 to the client units 12-3 to 12-5 connected to the local area network 22 through the wide area network 18 is transmitted between the communication control apparatuses 16 and 20. In the invention, the polling request message and polling response message are not directly sent to the wide area network 18. However, a sync control message is transmitted between a substitution response apparatus 24 provided for the communication control apparatus 16 and a substitution request apparatus 26 provided for the communication control apparatus 20. A case of requesting the polling from the server unit 10 to the client unit 12-3 will now be described hereinbelow as an example.

When the polling request message to the client units 12-3 to 12-5 side via the wide area network 18 is received, the substitution response apparatus 24 on the server unit 10 side returns the polling response message to the server unit 10. The substitution response apparatus 24 simultaneously transmits a substitution request start message to the substitution request apparatus 26 through the wide area network 18, thereby starting a substitution request process. Therefore, the substitution request start message which is transmitted from the substitution response apparatus 24 to the substitution request apparatus 26 through the network 18 is a control message to synchronize the operations of the substitution response and the substitution request.

When the processing operations of the substitution response apparatus 24 and substitution request apparatus 26 are started, the substitution response apparatus 24 returns a polling substitution response message each time the periodic polling request message is received from the server unit 10. The substitution request apparatus 26 repeats the transmission of the polling substitution request message to the client unit 12-3 at the same period as that of the server unit 10. In the case where no response message is returned from the client unit 12-3 in response to the regular transmission of the substitution request message by the substitution request apparatus 26, it is judged that the client unit 12-3 is stopped, a substitution response stop message is transmitted to the substitution response apparatus 24 via the wide area network 18, thereby stopping the responding operation of the substitution response apparatus 24 to the server unit 10. When the substitution response to the successive polling request messages of more than a predetermined number of times is not obtained, the server unit 10 regards that the client unit 12-3 stops the operation, so that the corresponding resource is opened.

When the client unit 12-3 which once stopped the polling response restarts the polling response to the substitution request message from the substitution request apparatus 26, the substitution request apparatus 26 transmits a substitution response restart message to the substitution response apparatus 24 through the network 18 and restarts to return the substitution response message for the receipt of the polling request message from the server unit 10.

The substituting processes by the substitution response apparatus 24 and substitution request apparatus 26 are finished in the following two cases: a case where the polling request from the server unit 10 is stopped and a case where the polling response from the client unit 12-3 is stopped. In any of those cases, the operation end is judged by monitoring a timer. When the substitution response apparatus 24 judges the end on the basis of the stop of the polling request from the server unit 10, a substitution request end message is transmitted to the substitution request apparatus 26 via the network 18 and the operation of the substitution request apparatus 26 is finished. On the other hand, when the substitution request apparatus 26 judges the operation end of the client unit 12-3, a substitution response end message is transmitted to the substitution response apparatus 24 via the network 18 and the responding operation is finished.

Further, when an accident such as a line fault occurs in the wide area network 18, the sync control message cannot be communicated between the substitution response apparatus 24 and the substitution request apparatus 26, so that the synchronization of the substituting processes is lost. Thus, when the substitution response apparatus 24 or the substitution request apparatus 26 detects a recovery of the line fault of the wide area network 18 or the like, a reset request message is transmitted to the partner side via the network 18, thereby initializing by forcedly resetting the substitution response and the substitution request and reconstructing a synchronous state. In addition, when the transmission of the polling request message from the server unit 10 to the client unit 12-3 continues for an abnormally long time, for example, more than one hour, the substitution response apparatus 24 judges such a state and transmits the reset request message to the substitution request apparatus 26 via the network 18, thereby resetting the substitution response apparatus 24 and the substitution request apparatus 26 into initial states.

Figure 2:
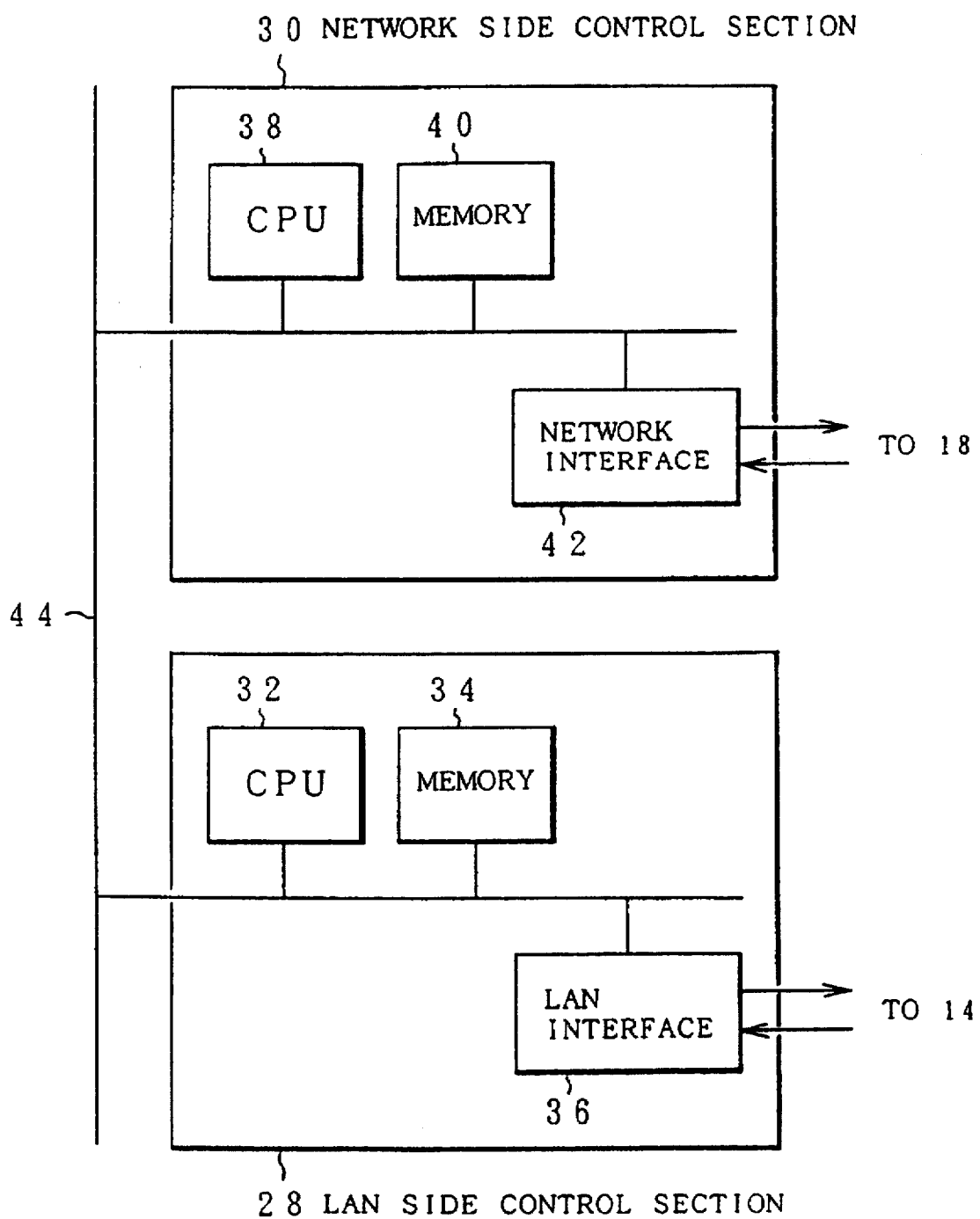
FIG. 2 is a block diagram of a communication control apparatus of FIG. 1.

FIG. 2 shows an embodiment of the communication control apparatus 16 provided on the server unit 10 side in FIG. 1. The communication control apparatus 16 comprises an LAN side control section 28 and a network side control section 30. A CPU 32, a memory 34, and an LAN interface 36 are provided for the LAN side control section 28. A CPU 38, a memory 40, and a network interface 42 are provided for the network side control section 30. Each unit of the LAN side control section 28 is connected to each unit of the network side control section 30 via an internal bus 44. The LAN side control section 28 executes message transmitting/ receiving processes to/from the server unit 10 connected to the local area network 14. The network side control section 30 executes message transmitting/receiving processes to/from the wide area network 18. As one of the functions of the message transmitting/receiving processes, the function of the substitution response apparatus 24 shown in FIG. 1 is provided. The LAN side control section 28 and the network side control section 30 exchange information through the internal bus 44 to make the states of both sections coincide. The communication control apparatus 20 including the substitution request apparatus 26 in FIG. 1 also has the same hardware structure as that of the communication control apparatus 16 in FIG. 2 but differs from it with respect to a point that the communication control apparatus 20 realizes the function as a substitution request apparatus 26.

Figure 3:
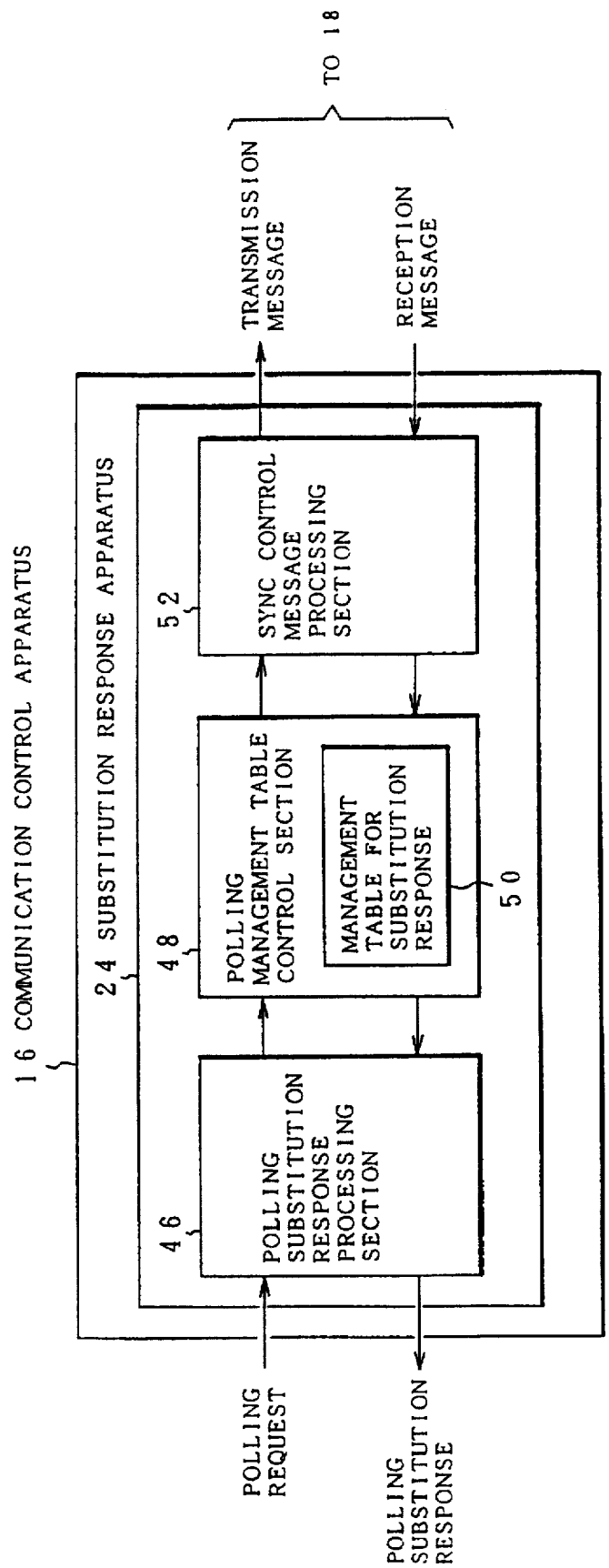
FIG. 3 is a functional block diagram of a substitution response apparatus.
Figure 4:
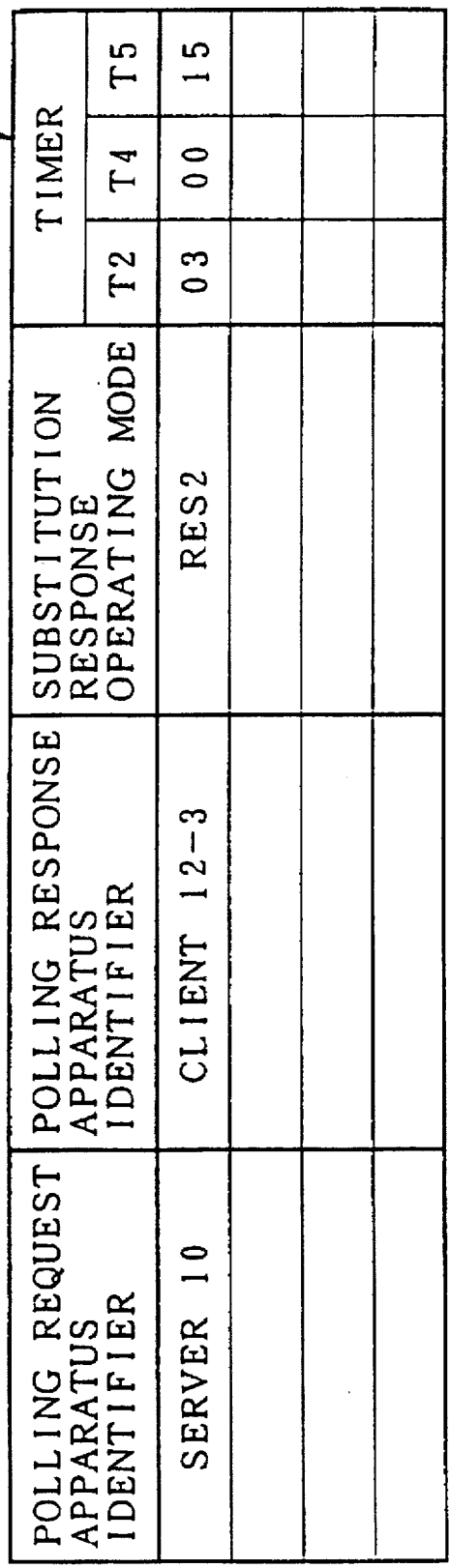
FIG. 4 is an explanatory diagram of a management table for substitution response.

FIG. 3 is a functional block diagram of the substitution response apparatus 24 provided for the communication control apparatus 16 which is constructed by the hardware of FIG. 2. The substitution response apparatus 24 comprises a polling substitution response processing section 46, a polling management table control section 48 and a sync control message processing section 52. A management table 50 for substitution response, shown in FIG. 4, is provided for the polling management table control section 48.

An identifier of the server 10 as a polling request apparatus identifier, an identifier of, for example, the client unit 12-3 as a polling response apparatus identifier, and further the present operating mode, for example, RES2 of the substitution response apparatus 24 are stored in the management table 50 for substitution response. The operating modes will be described hereinlater. Further, present values of timers T2, T4, and T5 which are used in the substitution response apparatus 24 to monitor the time are stored in the management table 50.

The polling substitution response processing section 46 in FIG. 3 refers to the management table 50 in response to the polling request from the server unit 10. For example, when the operating mode is set to the substitution response mode RES2 as shown in FIG. 4, the polling substitution response processing section 46 returns a polling substitution response. The sync control message processing section 52 transmits the substitution request start message, substitution request end message, or reset request message to the substitution request apparatus 26 as a polling request destination side via the network 18. The processing section 52 receives the substitution response stop message, substitution response end message, or reset request message transmitted from the substitution request apparatus 24 through the network 18. The polling management table control section 48 executes a whole process regarding the polling substitution response processing section 46 and sync control message processing section 52 and a rewriting process of the management table 50 for substitution response shown in FIG. 4.

Figure 5:
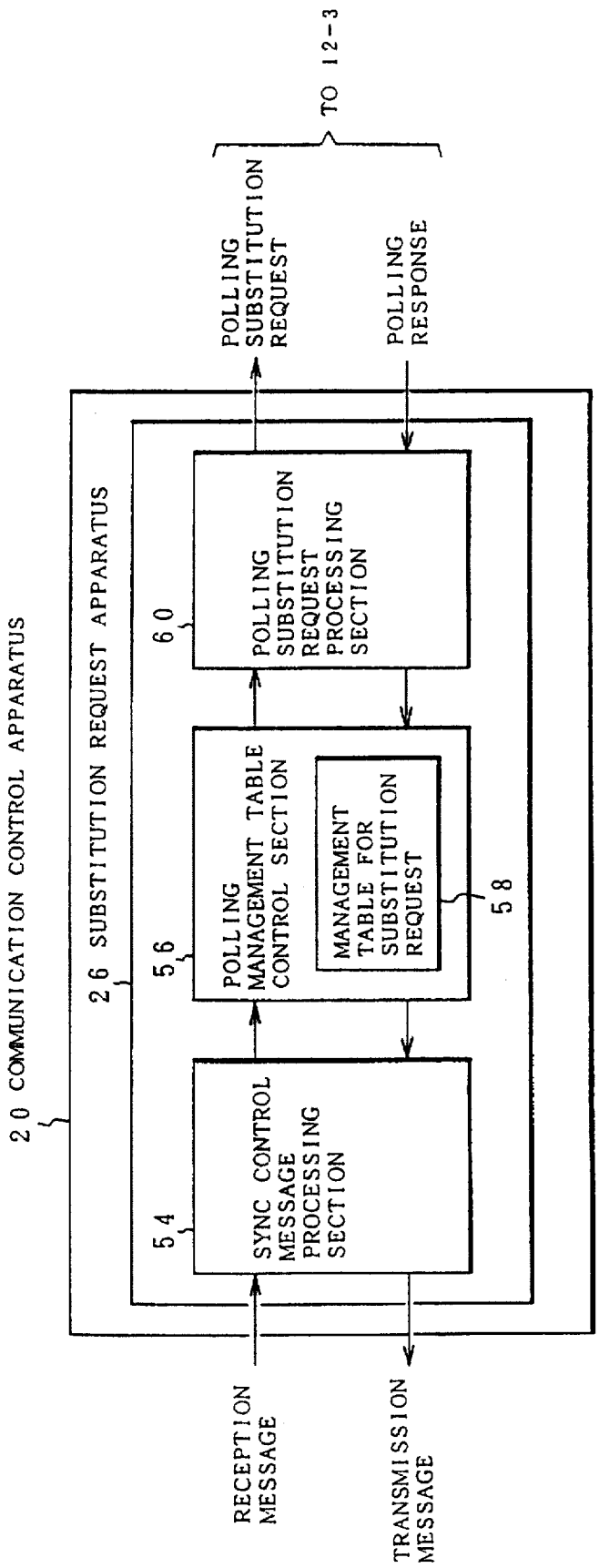
FIG. 5 is a functional block diagram of a substitution request apparatus.

FIG. 5 is a functional block diagram of the substitution request apparatus 26 of the communication control apparatus 20 provided on the client units 12-3 to 12-5 side as a polling request destination side in FIG. 1. The substitution request apparatus 26 comprises a sync control message processing section 54, a polling management table control section 56, and a polling substitution request processing section 60. A management table 58 for substitution request, shown in FIG. 6, is provided for the polling management table control section 56. In a manner similar to the management table 50 for substitution response in FIG. 4, the identifier of the server 10 as a polling request apparatus identifier and the identifier of, for example, the client 12-3 as a polling response apparatus identifier are stored in the management table 58 for substitution request. In this example, a substitution request mode REQ2 is set as a substitution request operating mode. Further, present timer values of various timers T0, T1, T3, T4, and T5 which are used for processes of the substitution request apparatus 26 are also stored. The sync control message processing section 54 receives the substitution request start message, substitution request end message, or reset request message as a sync control message from the substitution response apparatus 24 in FIG. 3 via the network 18. The sync control message processing section 54 transmits the substitution response stop message, substitution response end message, or reset request message to the substitution response apparatus 24 in FIG. 3 via the network 18.

The polling substitution request processing section 60 transmits the polling substitution request to, for example, the client unit 12-3 as a polling request destination side and receives the polling response which is transmitted from the client unit 12-3 in association with the substitution request. The polling management table control section 56 executes a whole control to the sync control message processing section 54 and the polling substitution request processing section 60 and a rewriting process of the management table 58 for substitution request shown in FIG. 6.

[Operating Mode, Message, and Timer Function of Substituting Process]

FIG. 7 shows the operating modes of the substitution response apparatus 24 on the server side. There are four operating modes in the substitution response apparatus 24 as follows:

I. Substitution response inoperating mode (RES1)
II. Substitution response mode (RES2)
III. Substitution response stop mode (RES3)
IV. Substitution response fault mode (RES4)

The substitution response inoperating mode RES1 relates to a state in which no polling request is received from the server unit 10. When the polling request is first received in the state of the substitution response inoperating mode RES1, the operating mode is shifted to the substitution response mode RES2. In the substitution response mode RES2, the substitution response is executed each time the polling request is received. The substitution response stop mode RES3 is a temporary stop mode in which no substitution response is performed even if the polling request is received. Further, the substitution response fault mode RES4 shows a state in which a synchronization cannot be obtained on a protocol with the substitution request apparatus because of a line fault of the network 18 or the like.

FIG. 8 shows operating modes of the substitution request apparatus provided on the client side. There are four operating modes in the substitution request apparatus 26 as follows:

I. Substitution request inoperating mode (REQ1)
II. Substitution request mode (REQ2)
III. Substitution request retransmission mode (REQ3)
IV. Substitution request fault mode (REQ4)

The substitution request inoperating mode REQ1 relates to a state in which the substitution request of polling is not transmitted to the client unit. The substitution request mode REQ2 is a mode in which the substitution request operation is started and the substitution request of polling is periodically transmitted to the client unit. The substitution request retransmission mode REQ3 is a mode in which a reception waiting time of the polling response from the client unit in response to the substitution request of polling is monitored by the timer T1 and when the timer T1 times out, the substitution request of polling is retransmitted. This mode is held until the polling response is obtained from the client unit or until the end of the operation of the client unit is judged. Although the substitution request of polling is transmitted every time-out of the timer T0, the value of the timer T0 can be also temporarily reduced in order to preponderantly confirm the operation/inoperation of the client unit. The substitution request fault mode REQ4 is a mode in which the synchronization cannot be obtained on a protocol with the substitution response apparatus 24 because of a line fault of the network 18 or the like in a manner similar to the case of the substitution response apparatus 24 in FIG. 7.

FIG. 9 shows the sync control messages to be transmitted/ received between the substitution response apparatus 24 and the substitution request apparatus 26 through the wide area network 18 in order to obtain the synchronization of the substituting processes. There are fundamentally seven kinds of messages as follows:

I. Substitution request start message (MES1)
II. Substitution response stop message (MES2)
III. Substitution response restart message (MES3)
IV. Substitution request end message (MES4)
V. Substitution response end message (MES5)
VI. Reset request message (MES6)
VII. Reset acknowledge message (MES7)

Among the seven messages, the substitution response apparatus 24 on the server unit 10 side transmits the following four messages: substitution request start message MES1; substitution request end message MES4; reset request message MES6; and reset acknowledge message MES7. The substitution request apparatus 26 on the client unit 12-3 side transmits the following five kinds of messages: substitution response stop message MES2; substitution response restart message MES3; substitution response end message MES5; reset request message MES6; and reset acknowledge message MES7.

The substitution request start message MES1 is a message which is transmitted when the substitution response apparatus 24 first receives the polling request message to, for example, the client unit 12-3 and is a message to instruct the substitution request apparatus 26 to enter the substitution request mode REQ2. The substitution response stop message MES2 is a message which is transmitted when the substitution request apparatus 26 does not receive the polling response message from, for example, the client unit 12-3 and is a message to instruct the substitution response apparatus 24 to enter the substitution response stop mode RES3. The substitution response restart message MES3 is a message which is transmitted to the substitution response apparatus 24 when the polling response message from the client unit 12-3 is restarted to the substitution request apparatus 26 and is a message to instruct to enter the substitution response mode RES2. The substitution request end message MES4 is a message which is transmitted to the substitution request apparatus 26 when the stop of the polling request from the server unit 10 is judged by the substitution response apparatus 24 and is a message to instruct to enter the substitution request inoperating mode REQ1. The substitution response end message MES5 is a message which is transmitted when the polling response from the client unit 12-3 is stopped and the operation stop is judged by the substitution request apparatus 26 and is a message to instruct to enter the substitution response inoperating mode RES1. The reset request message MES6 is a message such that when the substitution response apparatus 24 or substitution request apparatus 26 detects the recovery of the network 18 after the line fault thereof occurred, the message instructs the partner to finish the substituting processes regarding all of the pollings and to enter the substitution request inoperating mode REQ1 or substitution response inoperating mode RES1. The last reset acknowledge message MES7 is a message of an acknowledge response to inform the partner of the confirmation that the substitution request inoperating mode REQ1 or substitution response inoperating mode RES1 was set in association with the receipt of the reset request message MES6.

Figure 10:
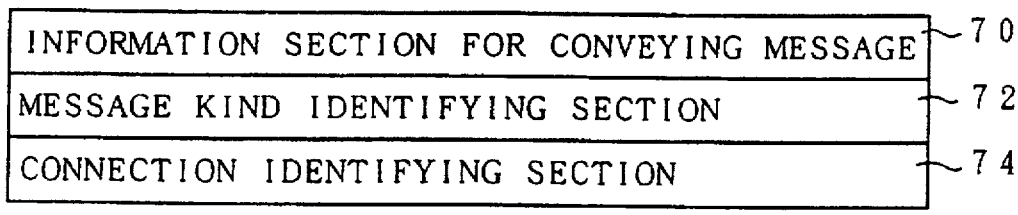
FIG. 10 is a schematic diagram of a format construction of sync control messages.

FIG. 10 shows a format construction of each of various messages for sync control in FIG. 9. The message format is constructed by an information section 70 for conveying a message, a message kind identifying section 72, and a connection identifying section 74. Those sections can be constructed by an arbitrary order in accordance with an agreement of both sides of the communication.

Figure 11:
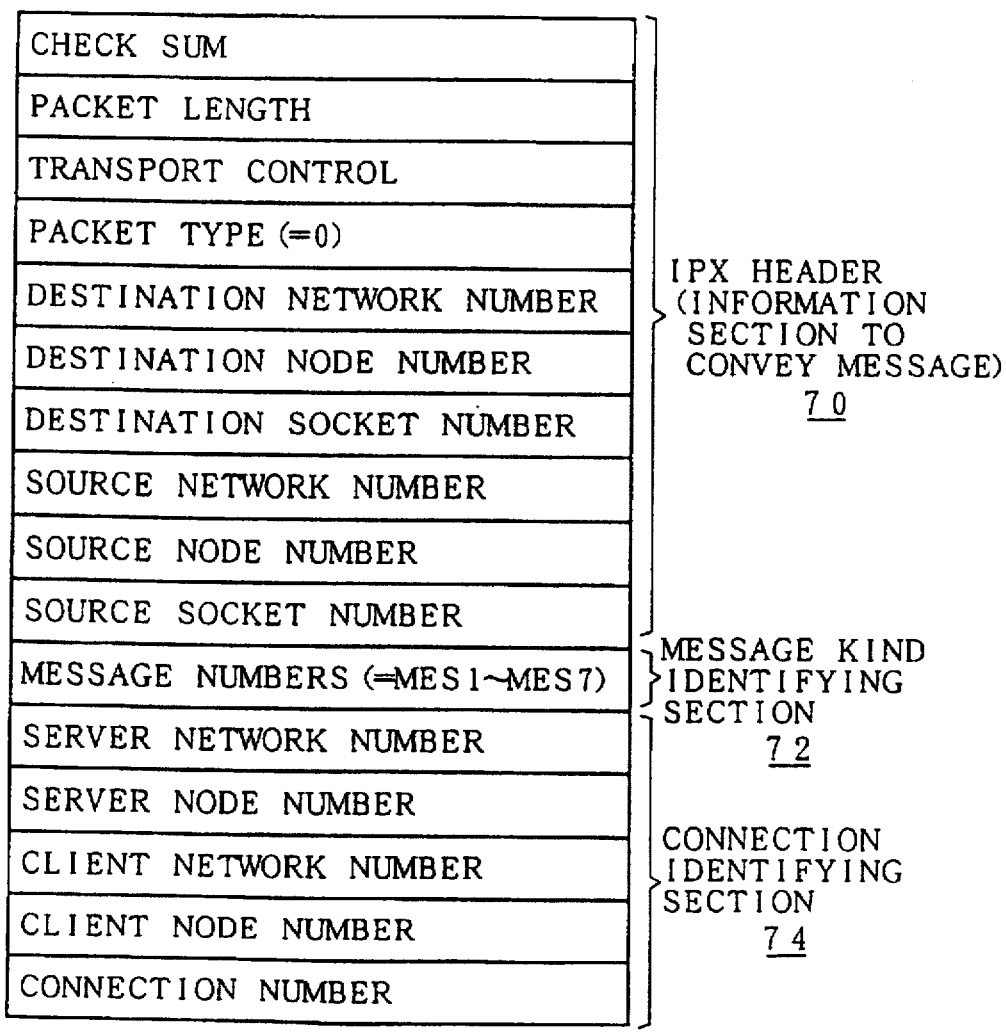
FIG. 11 is a detailed explanatory diagram of a format construction of sync control messages.

FIG. 11 shows the details of the message format of FIG. 10. The information section 70 for conveying a message is information necessary to convey the message on the network 18 and is constructed by a transmitting side address, a destination address, and the like and is generally called a header or payload. There are a distinction of seven hierarchies in reference layers of an OSI which is known as a communication model of a network, a kind of protocol, and the like. Various types of headers or payloads exist every classification of them. As a specific example, in the network such as CSMA/CD, FDDI, token ring, or the like, which is known at present as a general local area network, an MAC header having a transmitting side MAC address, a destination MAC address, and the like is added to the head of data. An HDLC protocol is often used as a base in an exclusive-use line or a protocol for line exchange known as a wide area network (WAN) in FIG. 1. The HDLC protocol has an address of two octets and a control section of one octet as a header. Further, as protocols of a network layer positioning at an upper level of each of such physical networks, there are TCP/IP, Net Ware known as an IPX, Apple Talk, XNS, and the like. Each of those network layer protocols has a header such as IP header, IPX header, Apple Talk header, XNS header, or the like. Further, there are various electronic mails as hierarchies nearest to the user. The header of the electronic mail also corresponds to the information section 70 for conveying a message in the invention.

In the specific example of FIG. 11, the information section 70 for conveying a message is set to the IPX header as a communication protocol of the Net Ware. The information section 70 for conveying a message using the IPX header is constructed by a check sum, a packet length, a transport control, a packet type, a destination network number, a destination node number, a destination socket number, a transmitting side network number, a transmitting side node number, and a transmitting side socket number. Either one of the message numbers MES1 to MES7 in FIG. 9 is set to the message kind identifying section 72. A server network number, a server node number, a client network number, a client node number, and a connection number are stored in the connection identifying section 74. Therefore, the server unit 10 can be identified by the server network number and server node number in the connection identifying section 74 and, for example, the client unit 12-3 can be identified by the client network number and client node number. The communication connection between the server unit 10 and a specific client unit, for example, the client unit 12-3 can be identified by the connection number. Further, all of the connections on the network 18 regarding the Net Ware protocol can be identified by combinations of the numbers set in the connection identifying section 74.

FIG. 12 shows a table of kinds and functions of the timers used for the substituting processes of the invention. In the substituting processes of the invention, the following six timers are used: polling substitution request transmission timer T0; polling response reception waiting timer T1; polling request reception timer T2; polling response reception timer T3; reset response waiting timer T4; and abnormal substitution monitoring timer T5. The substitution response apparatus 24 on the server unit 10 side has the polling request reception timer T2, reset response waiting timer T4 and abnormal substitution monitoring timer T5 in a manner similar to the management table 50 for substitution response in FIG. 4. The substitution request apparatus 26 has the polling substitution request transmission timer T0, polling response reception waiting timer T1, polling response reception timer T3, reset response waiting timer T4, and abnormal substitution monitoring timer T5 in a manner similar to the management table 58 for substitution request in FIG. 6.

The polling substitution request transmission timer T0 starts when the substitution request apparatus 26 transmits the polling substitution request to the client unit 12-3. After that, operations to transmit the polling substitution request and to restart are repeated each time the timer T0 times out.

The polling response reception waiting timer T1 starts when the substitution request apparatus 26 transmits the polling substitution request to the client unit 12-3 and monitors a reception waiting time of the polling response from the client unit 12-3. When the timer T1 times out, an operating mode is switched to the substitution request mode REQ2 and the substitution response stop message MES2 is transmitted to the substitution response apparatus 24 through the network 18.

The polling request reception timer T2 is a timer to start or restart when the substitution response apparatus 24 receives the polling request from the server unit 10. When the timer T2 times up, it is judged that the polling request from the server unit 10 was finished. The substitution request end message MES4 is sent to the substitution request apparatus 26 through the network 18, thereby instructing to finish.

The polling response reception timer T3 is a timer to start when the substitution request apparatus 26 receives the polling response. When the timer T3 times up, it is regarded that the operation of the client unit stops. The substitution response end message MES5 is sent to the substitution response apparatus 24, thereby instructing to finish.

The reset response waiting timer T4 is a timer to wait for the reception of the reset acknowledge message MES7 in response to the reset request message MES6 transmitted to the partner when the line fault is recovered. When the timer T4 times up, the reset request message MES6 is retransmitted and the timer T4 restarts.

The abnormal substitution monitoring timer T5 is a timer to judge the periodic reception of the polling request from the server unit 10 for an abnormally long time in the substitution response apparatus 24 or the transmission of the polling substitution request for an abnormally long time to the client unit in the substitution request apparatus 26. When the timer T5 times up, the reset request message MES6 is transmitted to the partner. In this instance, the timer T4 starts.

[Start of Polling Substituting Process]

Figure 13:
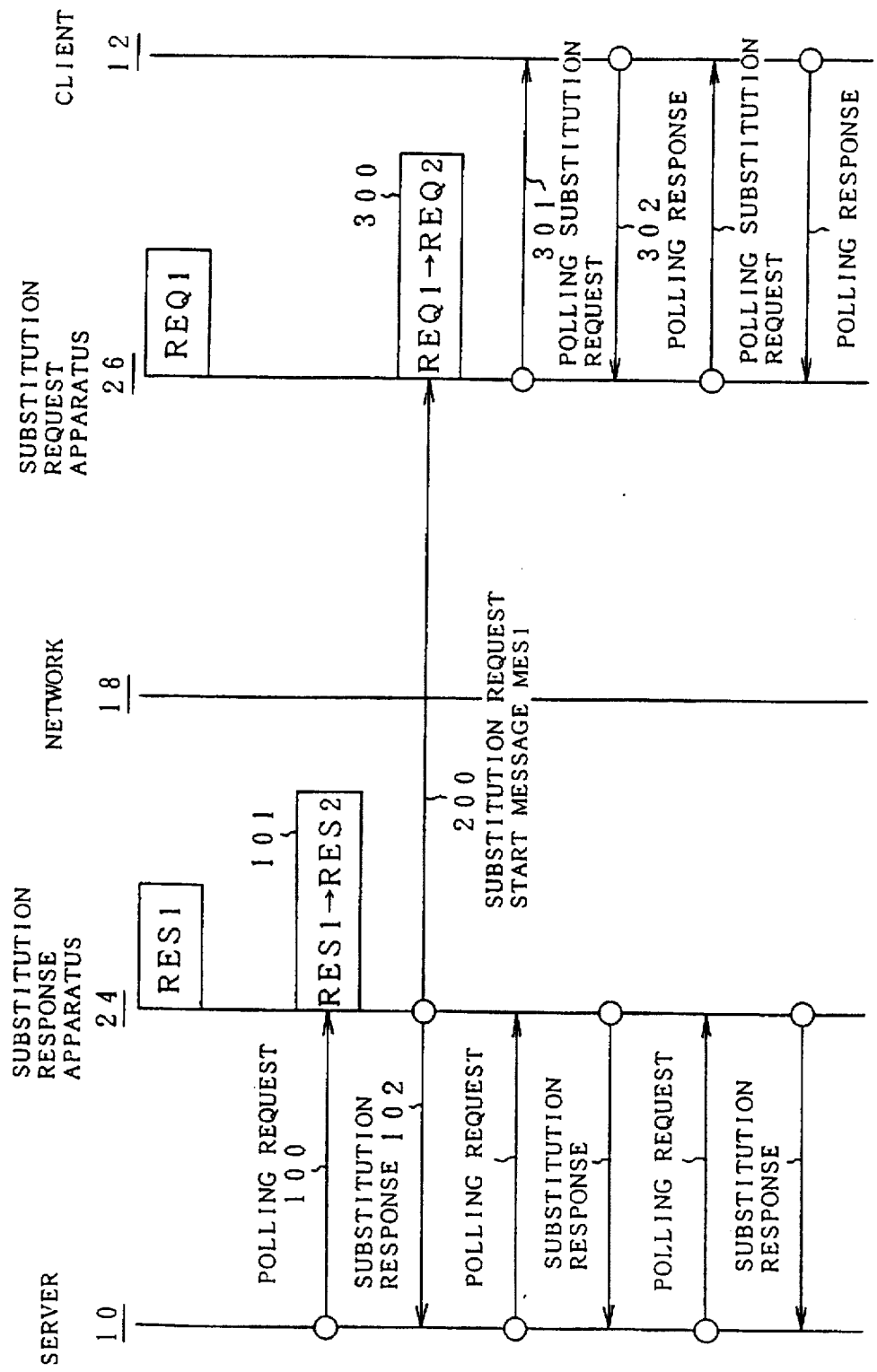
FIG. 13 is a time chart showing a procedures for a substitution starting process.

FIG. 13 shows procedures when the polling substitution response and polling substitution request start. Until the polling request is sent from the server unit 10, the substitution response apparatus 24 is in the substitution response inoperating mode RES1 and the substitution request apparatus 26 is in the substitution request inoperating mode REQ1. In such states, when the server unit 10 transmits a polling request 100, the substitution response apparatus 24 is switched from the substitution response inoperating mode RES1 to the substitution response mode RES2 as shown by a switching operation 101. When the operating mode is switched to the substitution response mode RES2, a substitution response 102 is transmitted to the server unit 10 and, simultaneously, a communication connection 200 to the substitution request apparatus 26 is established via the network 18 and the substitution request start message MES1 is sent. The substitution request apparatus 26 which received the substitution request start message MES1 is switched from the substitution request inoperating mode REQ1 so far to the substitution request mode REQ2 by a switching operation 300 and transmits a polling substitution request 301 to the client unit 12. When it is assumed that the client unit 12 has normally operated in this instance, the client unit 12 returns a polling response 302 in response to the polling substitution request 301. By such a transmission of the substitution request start message MES1 from the substitution response apparatus 24 to the substitution request apparatus 26 by the establishment of the communication connection 200, the start of the substitution response operation and substitution request operation are synchronized. After that, the substitution response by the substitution response apparatus 24 and the polling substitution request by the substitution request apparatus 26 are periodically repeated without using the communication connection through the network 18.

Figure 14:
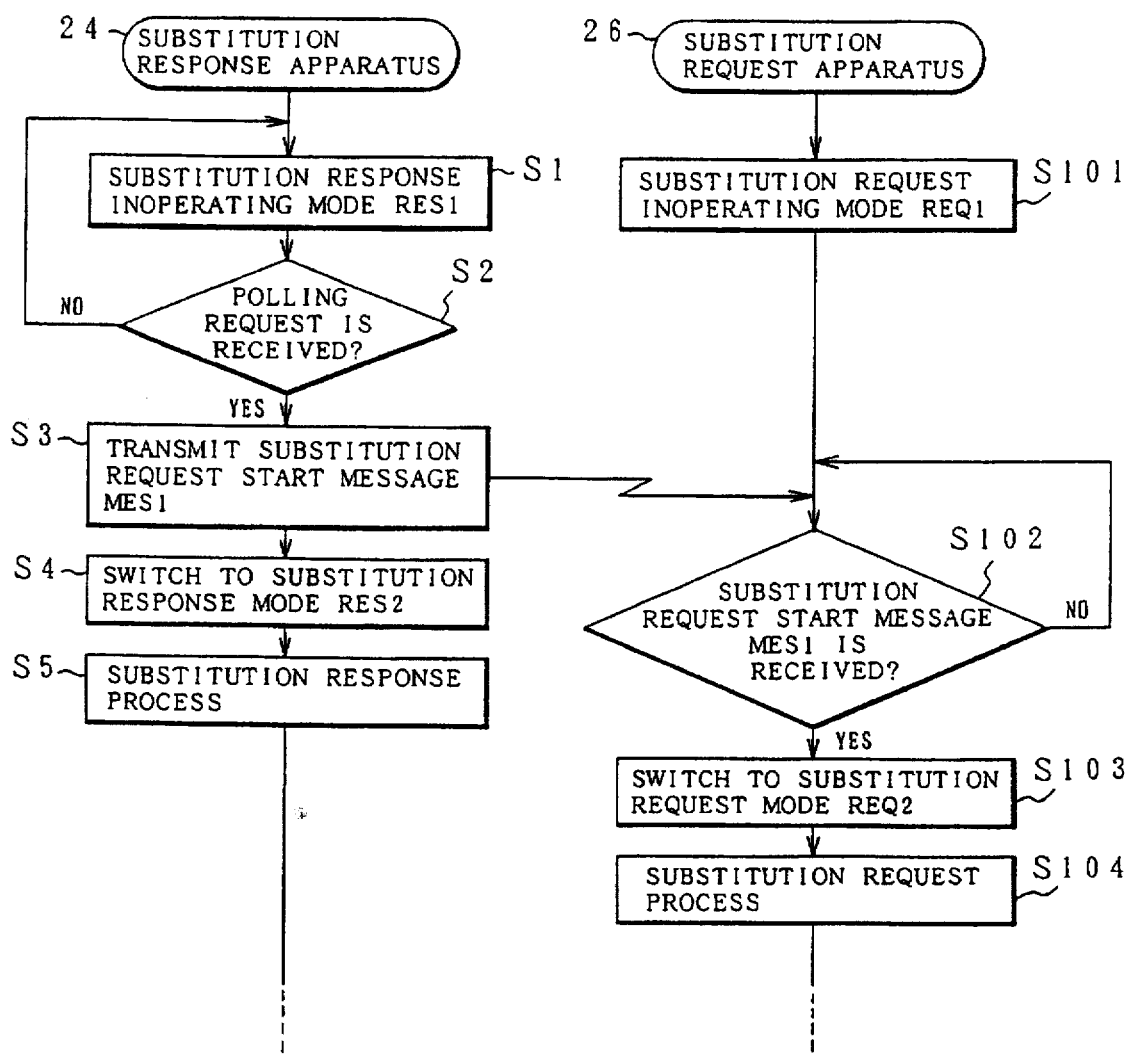
FIG. 14 is a flowchart for a substitution starting process.

A flowchart of FIG. 14 shows the processes of the substitution response apparatus 24 and substitution request apparatus 26 in FIG. 13. The substitution response apparatus 24 is in the substitution response inoperating mode RES1 in step S1. A check is made to see if the polling request from the server unit 10 has been received or not in step S2. When the polling request is received, step S3 follows and the substitution request start message MES1 is transmitted to the substitution request apparatus 26 through the network 18. In step S4, the substitution response apparatus 24 is switched to the substitution response mode RES2. In step S5, the processing routine advances to the substitution responding process to return the substitution response for the polling request. On the other hand, the substitution request apparatus 26 is first in the substitution request inoperating mode REQ1 as shown in step S101 and a check is made to see if the substitution request start message MES1 has been received or not in step S102. When the substitution request start message MES1 transmitted from the substitution response apparatus 24 is received, step S103 follows. The substitution request apparatus 26 switches the operating mode to the substitution request mode REQ2. The substitution requesting process is started in step S104.

[Polling Substitution Stopping Process (Substitution Temporary Stopping Process)]

Figure 15:
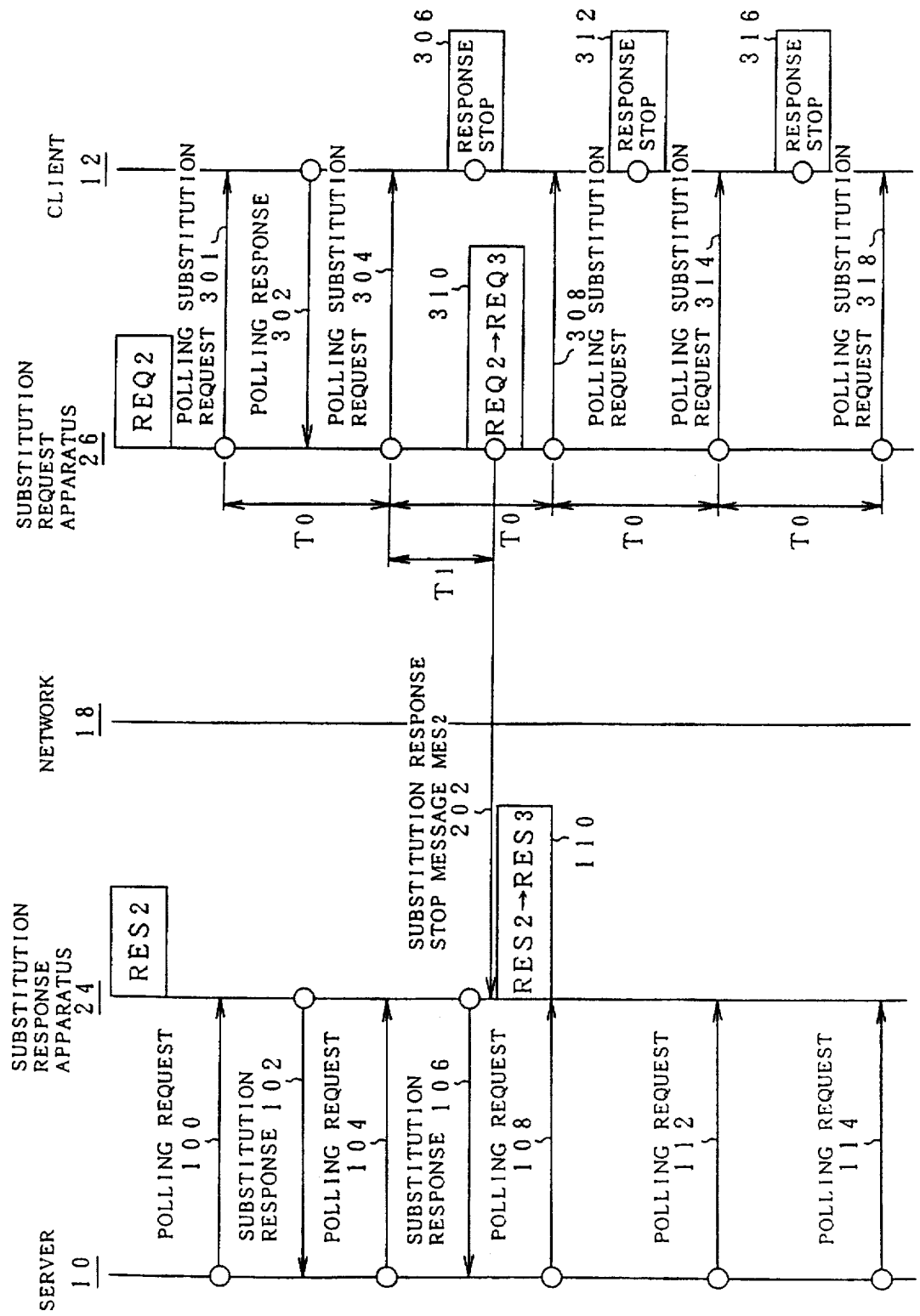
FIG. 15 is a time chart showing procedures for a substitution stopping process.

FIG. 15 shows processing procedures when the polling response from the client unit stops during the execution of the substitution response and substitution request. The substitution response apparatus 24 is now in the substitution response mode RES2 by the start of the substituting process in FIG. 13 and the substitution request apparatus 26 is in the substitution request mode REQ2. The substitution response apparatus 24 returns the substitution response 102 for the polling request 100 from the server unit 10. Similarly, a substitution response 106 is returned for a polling request 104. On the other hand, the substitution request apparatus 26 transmits the polling substitution request 301 to the client unit 102 and the polling response 302 is received for the request 301. Assuming now that when a polling substitution request 304 is transmitted, the client unit 12 stops the operation and the polling response is in a response stop 306 state. The substitution request apparatus 26 starts the polling response reception waiting timer T1 every transmission of the polling substitution request. The timer T1 which was activated at the time of the transmission of the polling substitution request 304 times out after the elapse of T1 time due to the response stop 306. On the basis of the time-out of the timer T1, the substitution request apparatus 26 is switched from the substitution request mode REQ2 to the substitution request retransmission mode REQ3 by a switching operation 310. When the substitution request retransmission mode REQ3 is set, the timer T1 is not operated. Only the transmission of the polling substitution request is repeated every time-out of the timer T0. On the other hand, the substitution request apparatus 26 is switched to the substitution request retransmission mode REQ3 by the time-out of the timer T1 and simultaneously establishes a communication connection 202 with the substitution response apparatus 24 via the network 18 and transmits the substitution response stop message MES2. When the substitution response stop message MES2 is received, the substitution response apparatus 24 switches the substitution response mode RES2 so far to the substitution response stop mode RES3 as shown by a switching state 110. The substitution response stop mode RES3 is a state such that no polling substitution response is sent even if a polling request 112 from the server unit 10 is received. Although the substitution request apparatus 26 in FIG. 15 transmits the substitution response stop message MES2 by one time-out of the timer T1, it is also possible to wait for the transmission of the substitution response stop message MES2 until the timer T1 successively times out a plurality of times in consideration of a possibility such as a loss of the polling substitution request due to a line error with the client unit 12 or the like.

Figure 16:
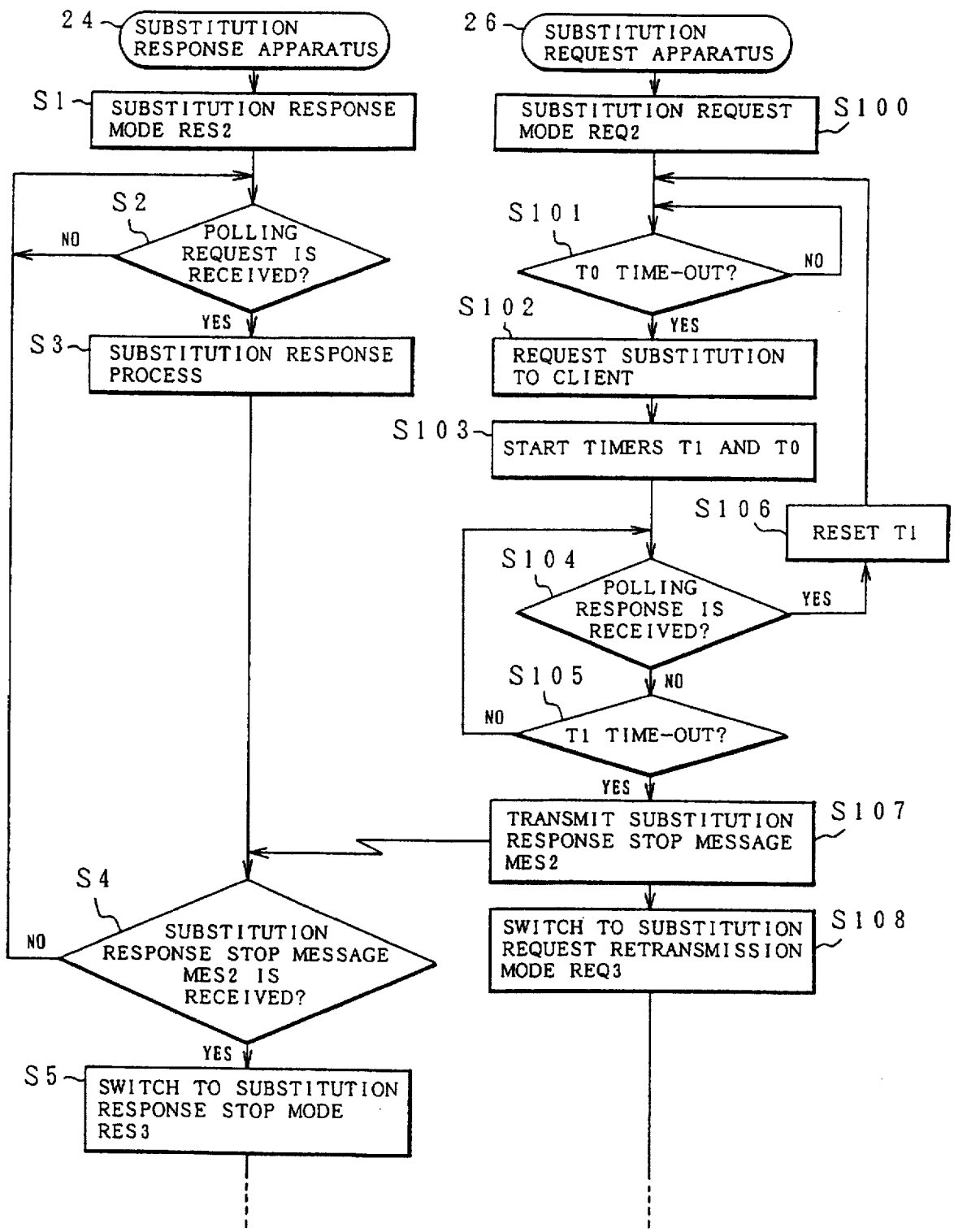
FIG. 16 is a flowchart for the substitution stopping process.

A flowchart of FIG. 16 shows the substitution stopping processes in the substitution response apparatus 24 and substitution request apparatus 26 in FIG. 15. The substitution request apparatus 26 is in the substitution request mode REQ2 in step S100 and monitors the time-out of the timer T0 in step S101. When the timer T0 times out, step S102 follows. The substitution request is transmitted to the client unit 12 in step S102 and, simultaneously, the timers T0 and T1 are started in step S103. In step S104, the reception of the polling response from the client unit 12 is checked. When the polling response is normally received, the timer T1 is reset in step S106. The processing routine is returned to step S101. After the time-out of the timer T0, step S102 follows and the next substitution request to the client unit 12 is sent. On the other hand, when the polling response is not received in step S104, the time-out of the timer T1 is monitored in step S105. In case of receiving no polling response from the client unit 12, the time-out of the timer T1 is judged in step S105. A processing routine advances to step S107 and the substitution response stop message MES2 is sent to the substitution response apparatus 24. In step S108, the operating mode is switched to the substitution request retransmission mode (no-response reception mode) REQ3.

The substitution response apparatus 24 is in the substitution response mode RES2 in step S1. When the reception of the polling request from the server unit 10 is judged in step S2, step S3 follows and the substitution responding process is executed. In step S4, the reception of the substitution response stop message MES2 is checked. The reception of the polling request in step S2 and the substitution responding process in step S3 are again repeated. When the substitution response stop message MES2 from the substitution request apparatus 26 is received in step S4, step S5 follows and the operating mode is switched to the substitution response stop mode RES3 and no substitution response is transmitted even if the polling request is received.

[Restart of Polling Substituting Process]

Figure 17:
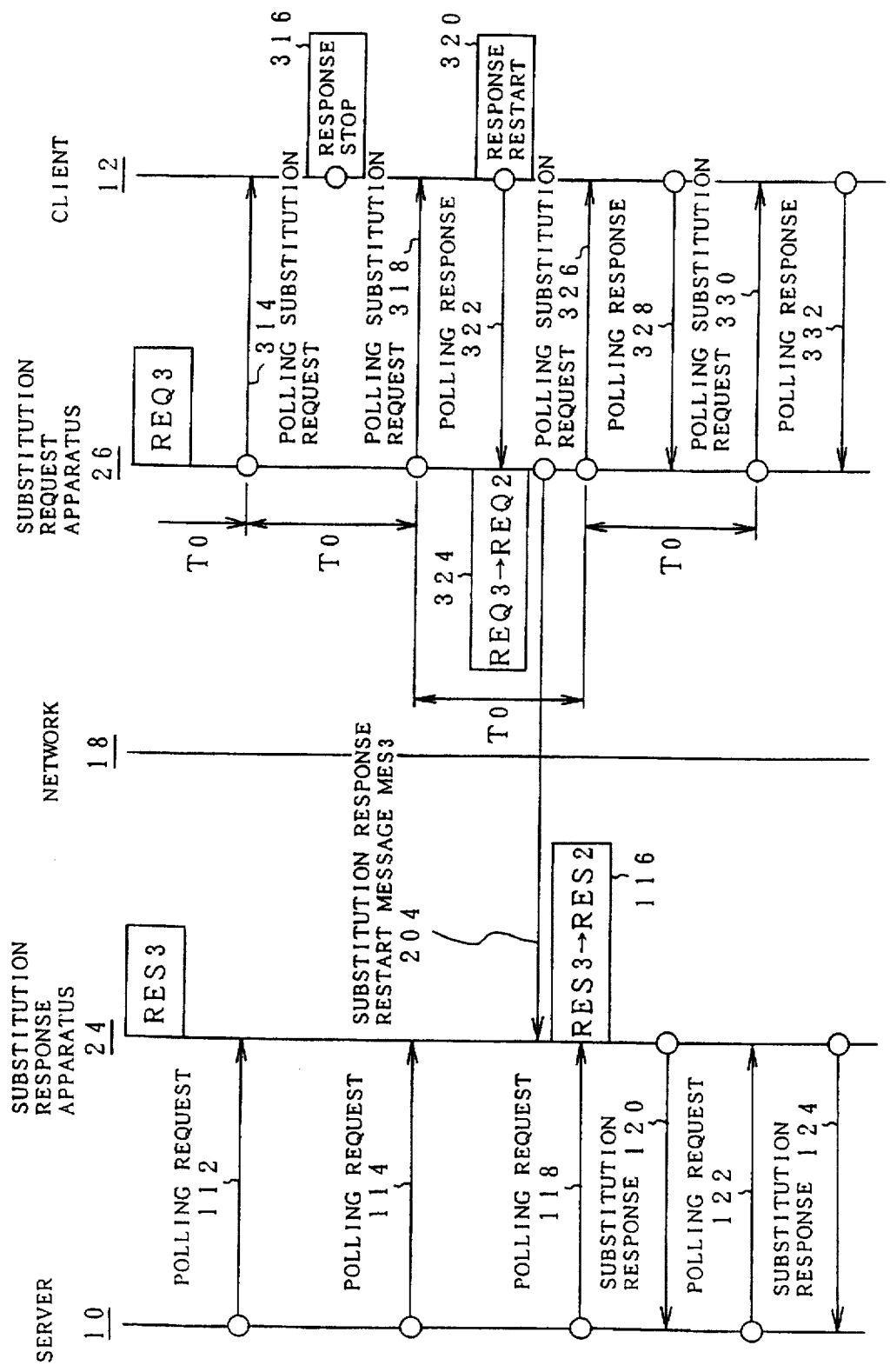
FIG. 17 is a time chart showing procedures for a substitution restarting process.

FIG. 17 shows procedures to restart the substituting process after shifting to the substitution stopping process as shown in FIG. 15. The substitution response apparatus 24 is in the substitution response stop mode RES3 due to the stop of the substituting process. The substitution request apparatus 26 is in the substitution request retransmission mode (no-response reception mode) REQ3. In the substitution request retransmission mode REQ3, the substitution request apparatus 26 sends a polling substitution request 314 each time the polling substitution request transmission timer T0 times out. Since the client unit 12 is in a response stop 316 state, however, no polling response is received. A polling substitution request 318 is again transmitted by the time-out of the timer T0. When it is assumed that the client unit 12 is in a response restart 320 state in this instance, a polling response 322 is received by the substitution request apparatus 26. When the polling response 322 is received, the substitution request apparatus 26 is switched from the substitution request retransmission mode REQ3 so far to the substitution request mode REQ2 by a switching operation 324. Simultaneously with the mode switching, a communication connection 204 via the network 18 is established with the substitution response apparatus 24 and the substitution response restart message MES3 is transmitted. After the substitution request apparatus 26 was switched to the substitution request mode REQ2, the transmission of a polling substitution request 326 and the reception of a polling response 328 are repeatedly executed. The substitution response apparatus 24 which received the substitution response restart message MES3 switches the substitution response stop mode RES3 so far to the substitution response mode RES2 by a switching operation 116. Thus, the substitution response apparatus 24 enters an execution state of the responding operation in which a substitution response 120 is sent for a polling request 118 after the switching.

Figure 18:
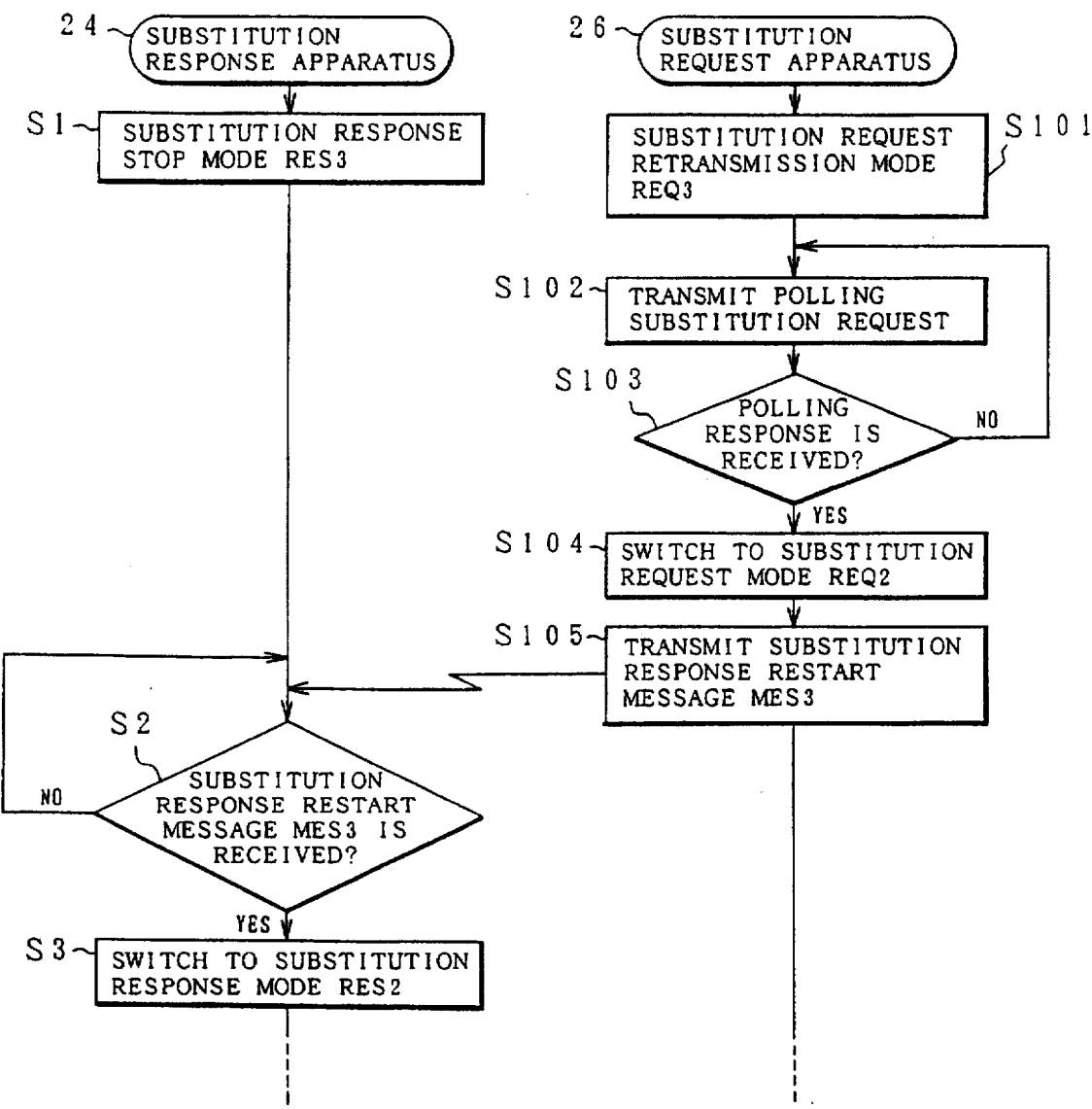
FIG. 18 is a flowchart for the substitution restarting process.

A flowchart of FIG. 18 shows the restart of the substituting processes of the substitution response apparatus 24 and substitution request apparatus 26 in FIG. 17. The substitution request apparatus 26 is in the substitution request retransmission mode REQ3 in step S101. The polling substitution request is transmitted on the basis of the time-out of the timer T0 in step S102. In step S103, a check is made to see whether the polling response has been received or not. When the operation of the client unit 12 restarts and the polling response is normally received, step S104 follows and the operating mode is switched to the substitution request mode REQ2. In step S105, the substitution response restart message MES3 is transmitted to the substitution response apparatus 24. The substitution response apparatus 24 is in the substitution response stop mode RES3 in step S1. In step S2, a check is made to see if the substitution response restart message MES3 from the substitution request apparatus 26 has been received or not. When the substitution response restart message MES3 is received, step S3 follows. The operating mode is switched to the substitution response mode RES2 and the substitution response is sent for the polling request from the server unit 10.

[Polling Substitution Finishing Process No. 1]

Figure 19:
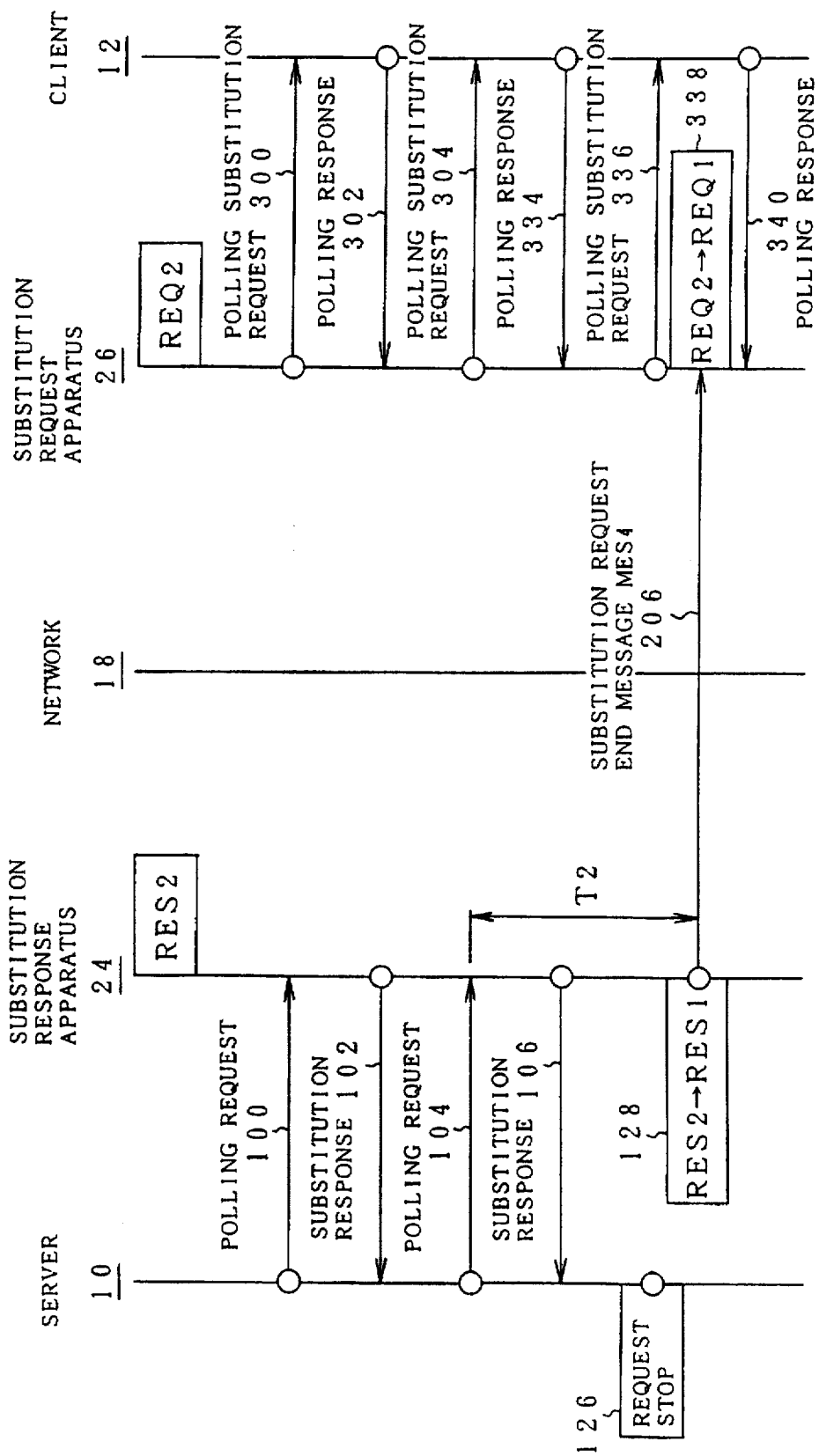
FIG. 19 is a time chart showing procedures for a finishing process from a substitution processing state.

FIG. 19 shows procedures for a substitution finishing process when the polling request from the server unit 10 is stopped in a state in which the substitution response apparatus 24 is in the substitution response mode RES2 and the substitution request apparatus 26 is in the substitution request mode REQ2. In the substitution response mode RES2, for example, the substitution response apparatus 24 transmits the substitution response 102 for the polling request 100 from the server 10. The substitution response apparatus 24 also similarly transmits the substitution response 106 for the next polling request 104. It is assumed that the server unit 10 stops the polling request as shown in a request stop 126 after that. Each time the polling requests 100 and 104 are received from the server unit 10, the substitution response apparatus 24 starts the polling request reception timer T2. If the polling request was normally performed, the next polling request is executed before the timer T2 times out. The timer T2 restarts. When the polling request stop 126 occurs in the server unit 10 after the timer T2 was started by the polling request 104, the substitution response apparatus 24 judges that the polling request from the server unit 10 stopped at the time of the time-out of the timer T2. The substitution response mode RES2 so far is shifted to the substitution response inoperating mode RES1 in accordance with a switching state 128. At the same time, a communication connection 206 is established with the substitution request apparatus 26 via the network 18 and a substitution request end message MES4 is transmitted.

The substitution request apparatus 26 periodically generates the polling substitution request 300 in the state of the substitution request mode REQ2 and receives the polling response 302 from the client unit 12. For example, after a polling request 336 was transmitted, the substitution request end message MES4 is received from the substitution response apparatus 24 via the network 18. When the substitution request end message MES4 is received, the substitution request apparatus 26 shifts from the substitution request mode REQ2 so far to the substitution request inoperating mode REQ1 by a switching state 338 and stops the transmission of the polling substitution request to the client unit 12. Thus, the synchronization of the substitution ends of the substitution response apparatus 24 and substitution request apparatus 26 is obtained.

Figure 20:
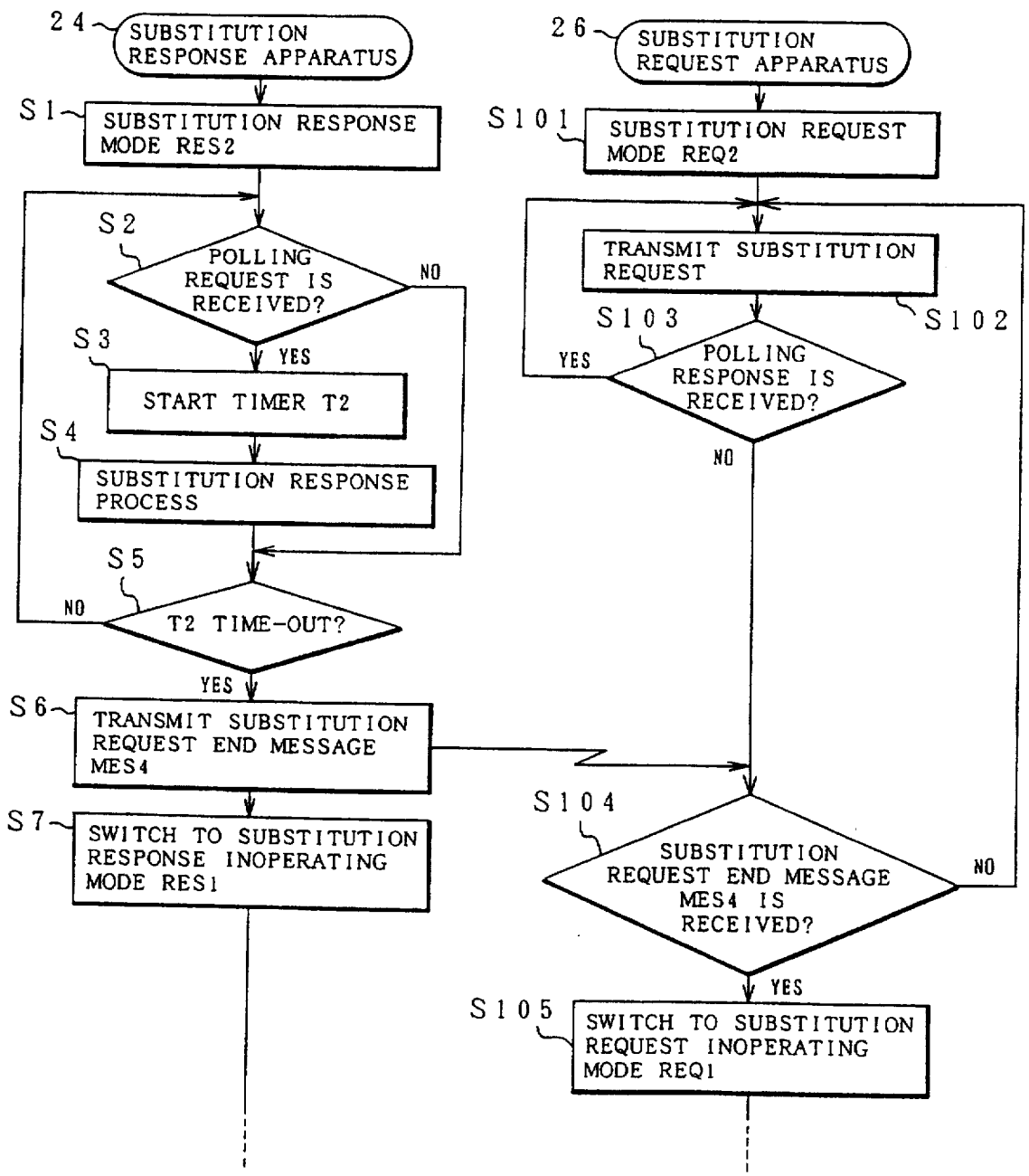
FIG. 20 is a flowchart for the finishing process in FIG. 19.

A flowchart of FIG. 20 shows the substitution finishing process in FIG. 19. The substitution response apparatus 24 is in the substitution response mode RES2 in step S1. In step S2, when the polling request is received from the server unit 10, the timer T2 is started. In step S4, the substitution response is transmitted to the server unit. In step S5, the time-out of the timer T2 is monitored. When the polling request is again received in step S2 before time-out, step S3 follows and the timer T2 is restarted and the substitution responding process in step S4 is executed. When the polling request from the server unit 10 is stopped, the time-out of the timer T2 is judged in step S5. Step S6 follows and the substitution request end message MES4 is transmitted to the substitution request apparatus 26. In step S7, the operating mode is switched to the substitution response inoperating mode RES1.

The substitution request apparatus 26 is in the substitution request mode REQ2 in step S101. In step S102, the substitution request is transmitted to the client unit 12. In step S103, when the polling response from the client unit 12 is received, the processing routine is returned to step S102 and the substitution request is transmitted. Until the polling response is received in step S103, the reception of the substitution request end message MES4 is checked in step S104. When the substitution request end message MES4 from the substitution response apparatus 24 is received, step S105 follows. The operating mode is switched to the substitution request inoperating mode REQ1 and the transmission of the substitution request to the client unit 12 is stopped.

[Polling Substitution Finishing Process No. 2]

Figure 21:
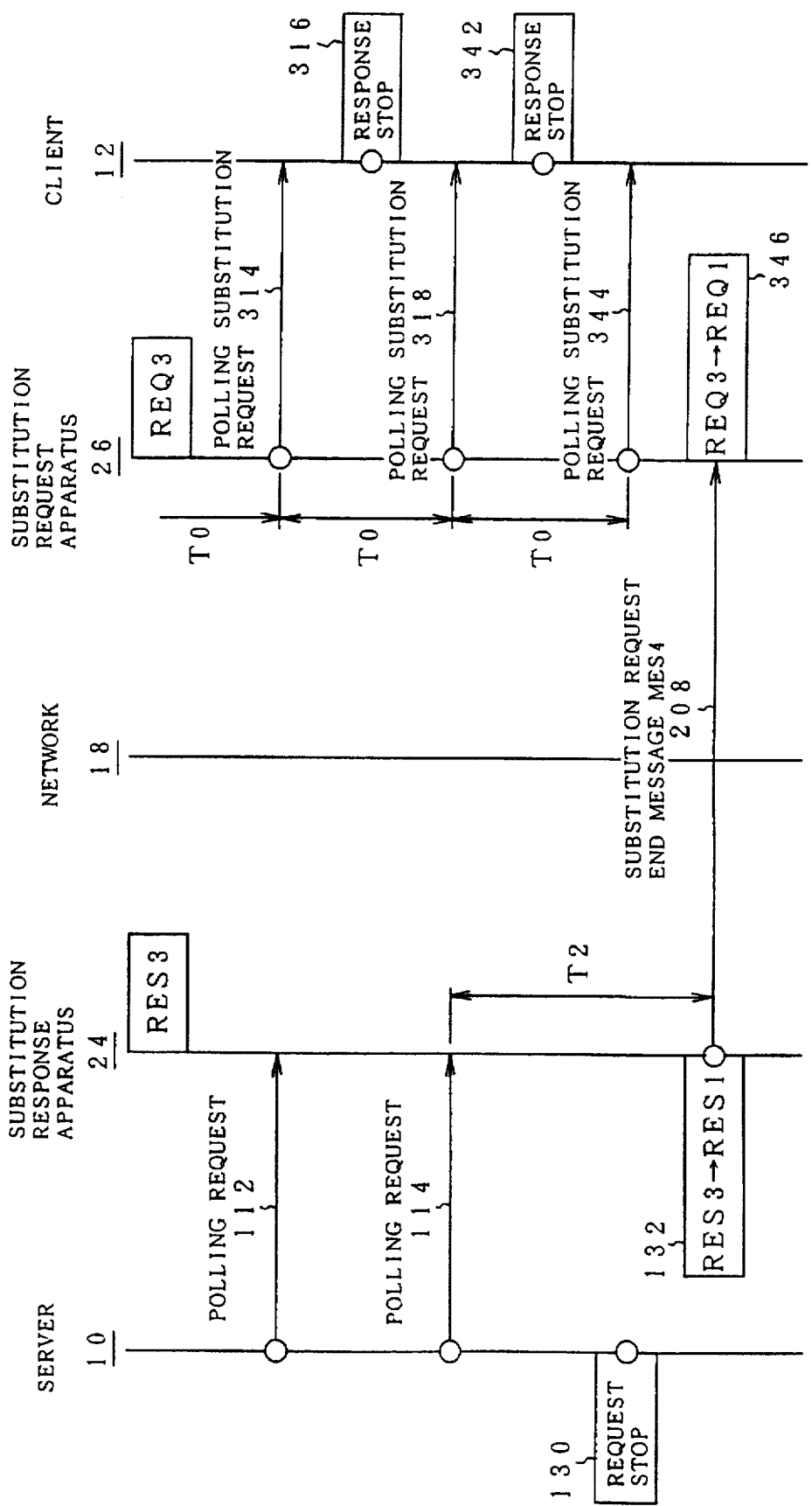
FIG. 21 is a time chart showing a finishing process from a substitution stop state.

FIG. 21 shows finishing procedure of the substituting process in the case where the polling request from the server unit 10 is stopped when the substitution response apparatus 24 is in the substitution response stop mode RES3 and the substitution request apparatus 26 is in a substitution request retransmission mode (no-response reception mode) REQ3. Since the substitution response apparatus 24 is in the substitution response stop mode RES3, the substitution request is not transmitted for polling requests 112 and 114 from the server unit. It is assumed that each time the polling requests 112 and 114 are received, the polling request reception timer T2 is started and, after the polling request 114 was received, a polling request stop 130 occurs in the server unit 10. Therefore, the timer T2 which started by the polling request 114 times out. The substitution response apparatus 24 is shifted from the substitution response stop mode RES3 to the substitution response inoperating mode RES1 in accordance with the switching state 132. At the same time, a communication connection 208 for the substitution request apparatus 26 is established through the network 18 and the substitution request end message MES4 is transmitted.

Since the substitution request apparatus 26 is in the substitution request retransmission mode REQ3, the polling substitution requests 314, 318, and 344 are performed to the client unit 12 every time-out of the timer T0. However, the client unit 12 is in a state of response stops 316 and 342 for any of those requests. The substitution request end message MES4 from the substitution response apparatus 24 is received after the transmission of the polling substitution request 344. The substitution request apparatus 26 is switched from the substitution request retransmission mode REQ3 to the substitution request inoperating mode REQ1 in accordance with a switching state 346. Thus, in association with the stop of the polling request from the server unit 10, the processing ends of the substitution response apparatus 24 and substitution request apparatus 26 are synchronously performed.

Figure 22:
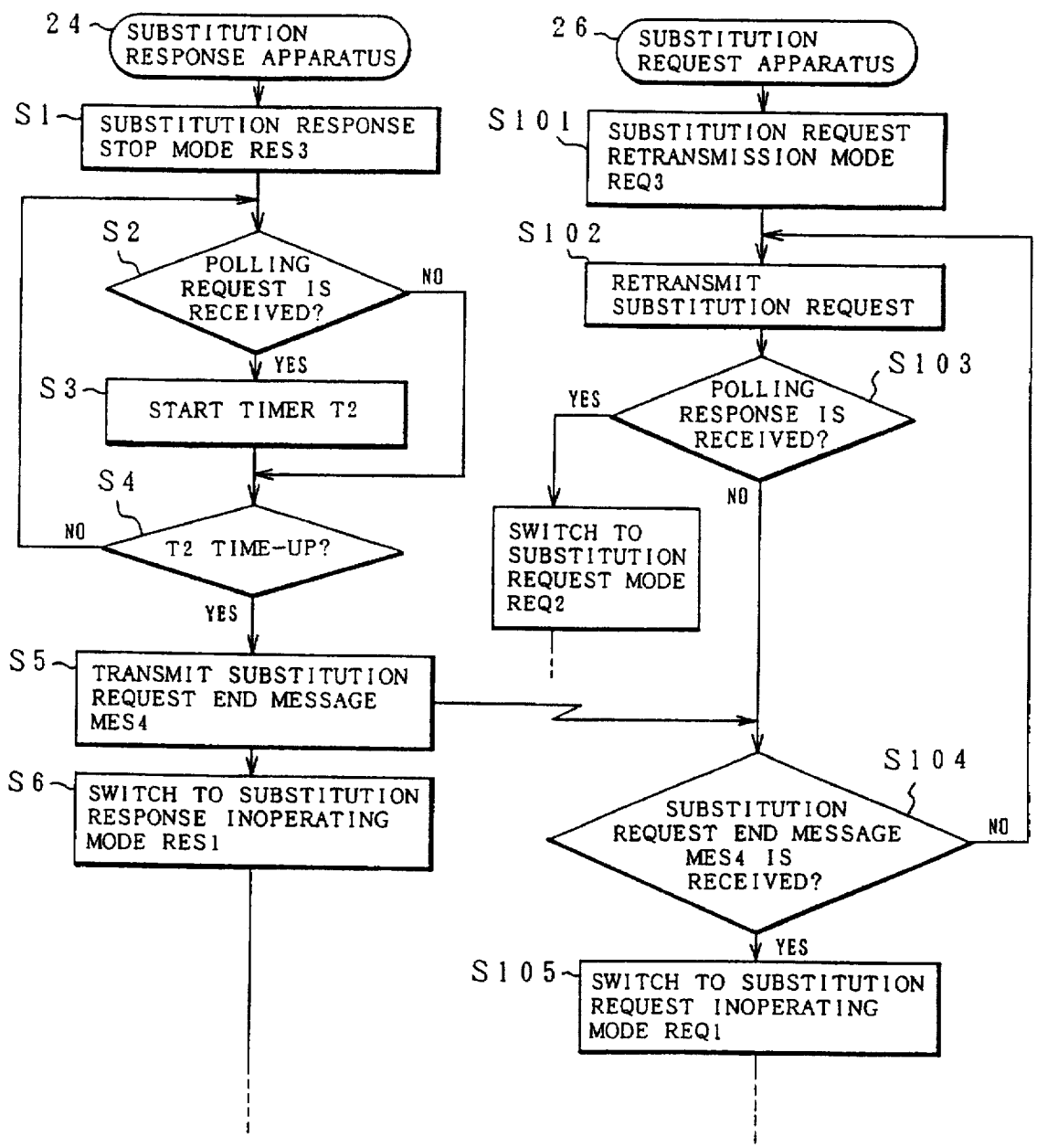
FIG. 22 is a flowchart for the finishing process in FIG. 21.

A flowchart of FIG. 22 shows the substitution finishing processes of the substitution response apparatus 24 and substitution request apparatus 26 in FIG. 21. The substitution response apparatus 24 is in the substitution response stop mode RES3 in step S1. When the polling request from the server unit 10 is received in step S2, the timer T2 is started in step S3. The time-out of the timer T2 is checked in step S4. When the polling request from the server unit is stopped, the time-out of the timer T2 is judged in step S4. The substitution request end message MES4 is transmitted to the substitution request apparatus 26 in step S5. In step S6, the operating mode is switched to the substitution response inoperating mode RES1.

The substitution request apparatus 26 is in the substitution request retransmission mode RES3 in step S101. In step S102, the polling substitution request based on the time-out of the timer T0 is transmitted. In response to the transmission of the polling substitution request, the presence or absence of the reception of the polling response is checked in step S103. However, since the operation of the client unit 12 is stopped, the polling response is not received. In step S104, the reception of the substitution request end message MES4 is checked. When the reception of the substitution request end message MES4 from the substitution response apparatus 24 is judged in step S104, step S105 follows and the operating mode is switched to the substitution request inoperating mode REQ1.

[Polling Substitution Finishing Process No. 3]

Figure 23:
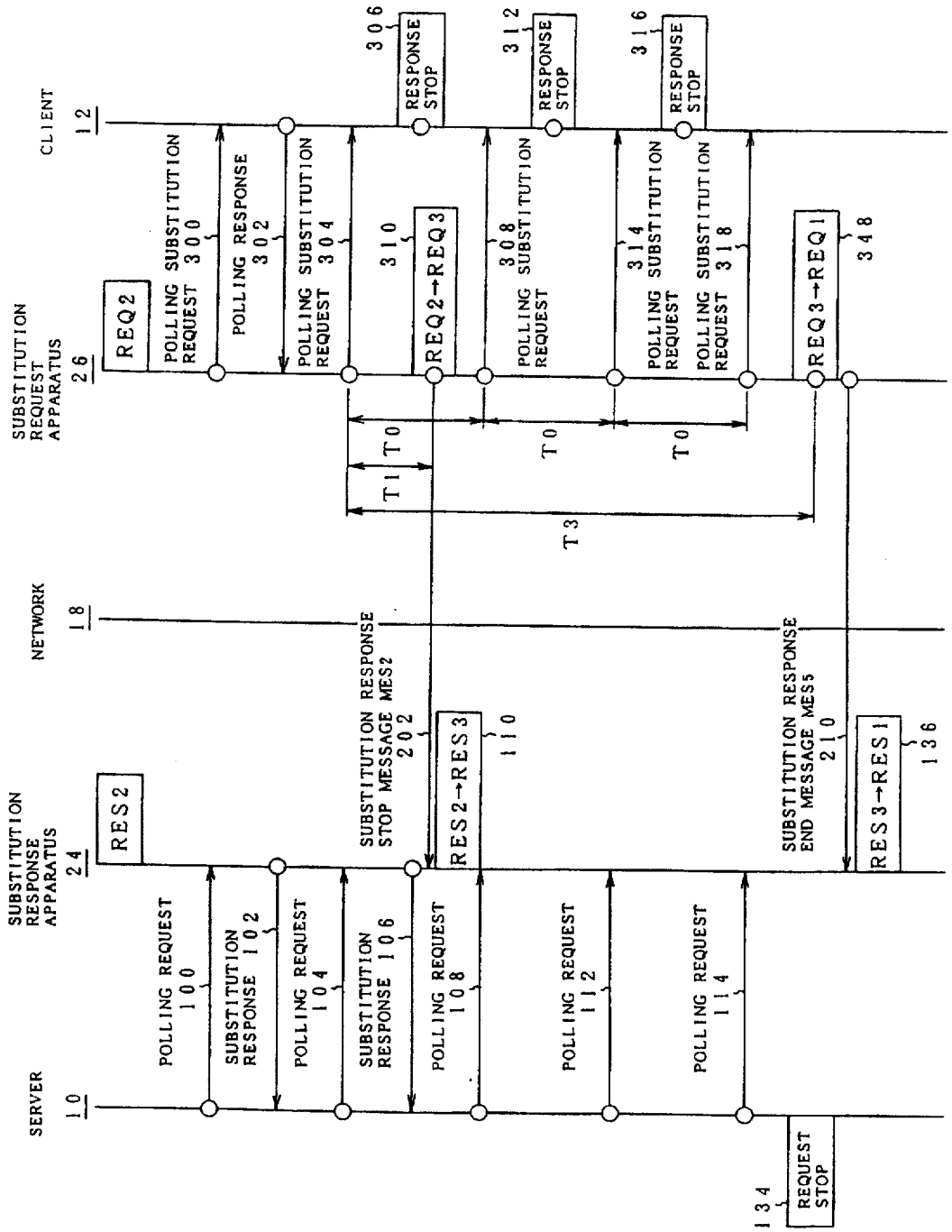
FIG. 23 is a time chart showing another embodiment of the finishing process from the substitution stop state.

FIG. 23 shows other processing procedures for the substitution finishing process and they are applied only in the case where the following two conditions are satisfied.

[Condition 1]

When the polling procedure of the server unit 10 doesn't receive a response to the polling request for a predetermined time, the polling request is finished.

[Condition 2]

The substitution response apparatus 24 has already been set to the substitution response stop mode RES3 and the substitution request apparatus 26 has already been set to the substitution request retransmission mode REQ3.

In FIG. 23, the substitution response apparatus 24 is first in the substitution response mode RES2 and the substitution request apparatus 26 is also in the substitution request mode REQ2. However, the timer T1 times out by the response stop 306 of the client unit 18, the substitution request apparatus 26 is shifted to the substitution request retransmission mode REQ3 as shown in the switching state 310, the communication connection 202 is established via the network 18, and the substitution response stop message MES2 is sent to the substitution response apparatus 24. The substitution response apparatus 24 is also switched to the substitution response stop mode RES3 as shown in the switching operation 110. Therefore, the substitution response from the substitution response apparatus 24 is not performed for the polling request 112 from the next server unit. When the server unit 10 doesn't receive a response to the polling request for a predetermined time as shown in the above condition 1, a polling request stop 134 occurs and the polling request is finished.

On the other hand, in the substitution request apparatus 26, the polling response reception timer T3 is activated each time the polling substitution requests 300 and 304 are performed in the substitution request mode REQ2. The timer T3 is finally activated by the polling substitution request 304. After that, the timer T3 is not restarted. Therefore, for example, the timer T3 times out after the transmission of the substitution request retransmission 318 after the shifting to the substitution request retransmission mode REQ3. At the time point of the time-out of the timer T3, the polling request stop 134 is performed almost at the same time on the server unit 10 side. The substitution request apparatus 26 is switched from the substitution request retransmission mode REQ3 to the substitution request inoperating mode REQ1 as shown in a switching operation 348 on the basis of the time-out of the timer T3. At the same time, a communication connection 210 is established via the network 18 and a substitution response end message MES5 is transmitted to the substitution response apparatus 24. When the substitution response end message MES5 is received, the substitution response apparatus 24 is switched from the substitution response stop mode RES3 to the substitution response inoperating mode RES1 by a switching operation 136. In the substitution request apparatus 26, when the client unit 12 is set into the operating state and performs the polling response before the timer T3 times out, the procedure for the substitution finishing process can be returned to the substitution restarting process in FIG. 17.

Figure 24:
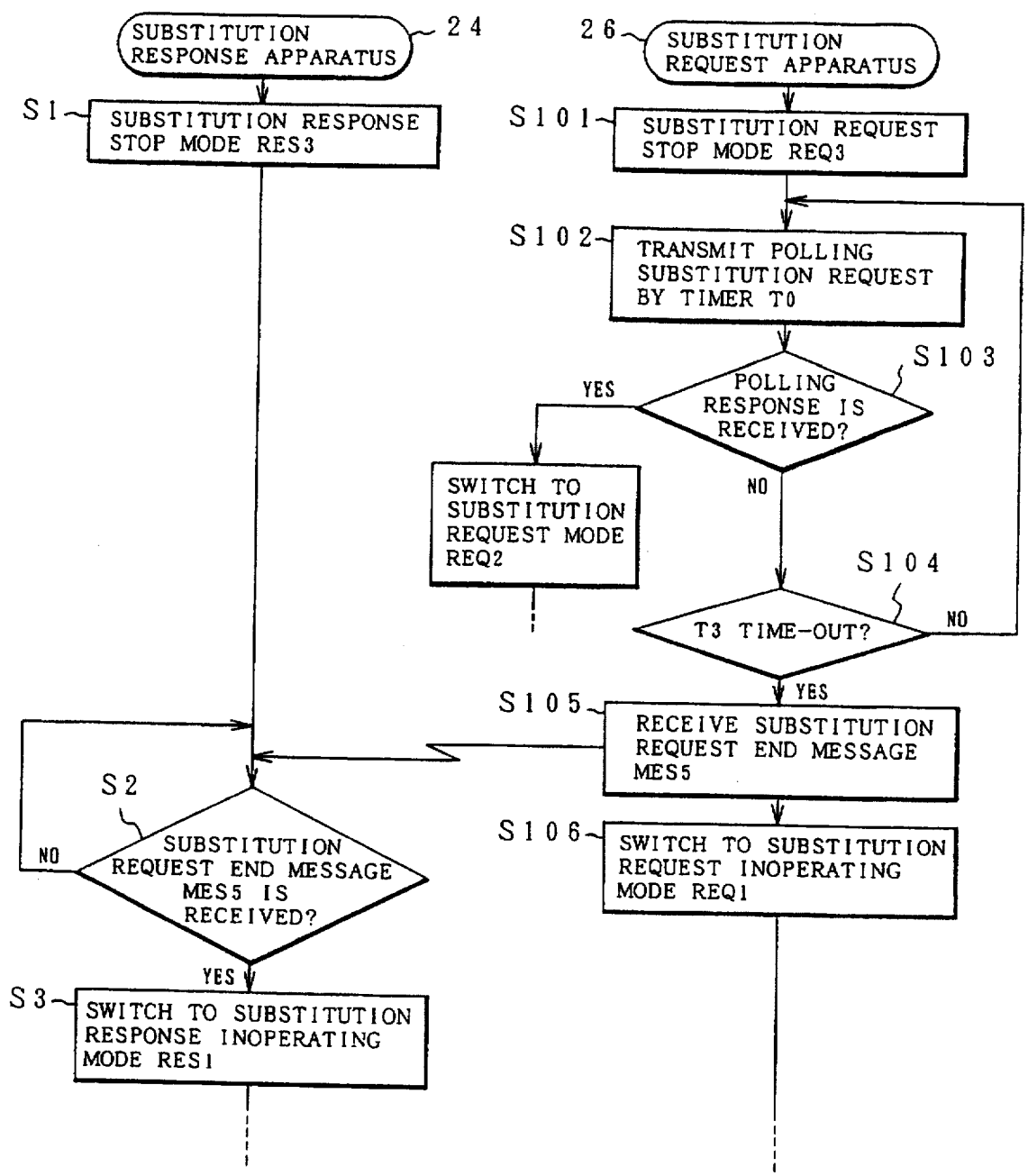
FIG. 24 is a flowchart for the finishing process in FIG. 23.

A flowchart of FIG. 24 shows the substitution finishing processes of the substitution response apparatus 24 and substitution request apparatus 26 in FIG. 23. The substitution request apparatus 26 is in the substitution request retransmission mode REQ3 in step S101. In step S102, the polling substitution request is transmitted each time the timer T0 times out. In step S103, the reception of the polling response is checked. Further in step S104, the time-out of the timer T3 which started on the basis of the substitution request transmitted finally in the state of the substitution request mode REQ2 before then is checked. When the polling response from the client unit 12 is not received and the time-out of the timer T3 is judged in step S104, step S105 follows. The substitution request end message MES5 is transmitted to the substitution response apparatus 24. In step S106, the operating mode is switched to the substitution request inoperating mode REQ1. The substitution response apparatus 24 is in the substitution response stop mode RES3 in step S1 and the processing routine advances to step S2. The reception of the substitution request end message MES5 is checked. When the substitution request end message MES5 is received from the substitution request apparatus 26, step S3 follows and the operating mode is switched to the substitution response inoperating mode RES1.

[Resetting Process for Synchronization Deviation]

Figure 25:
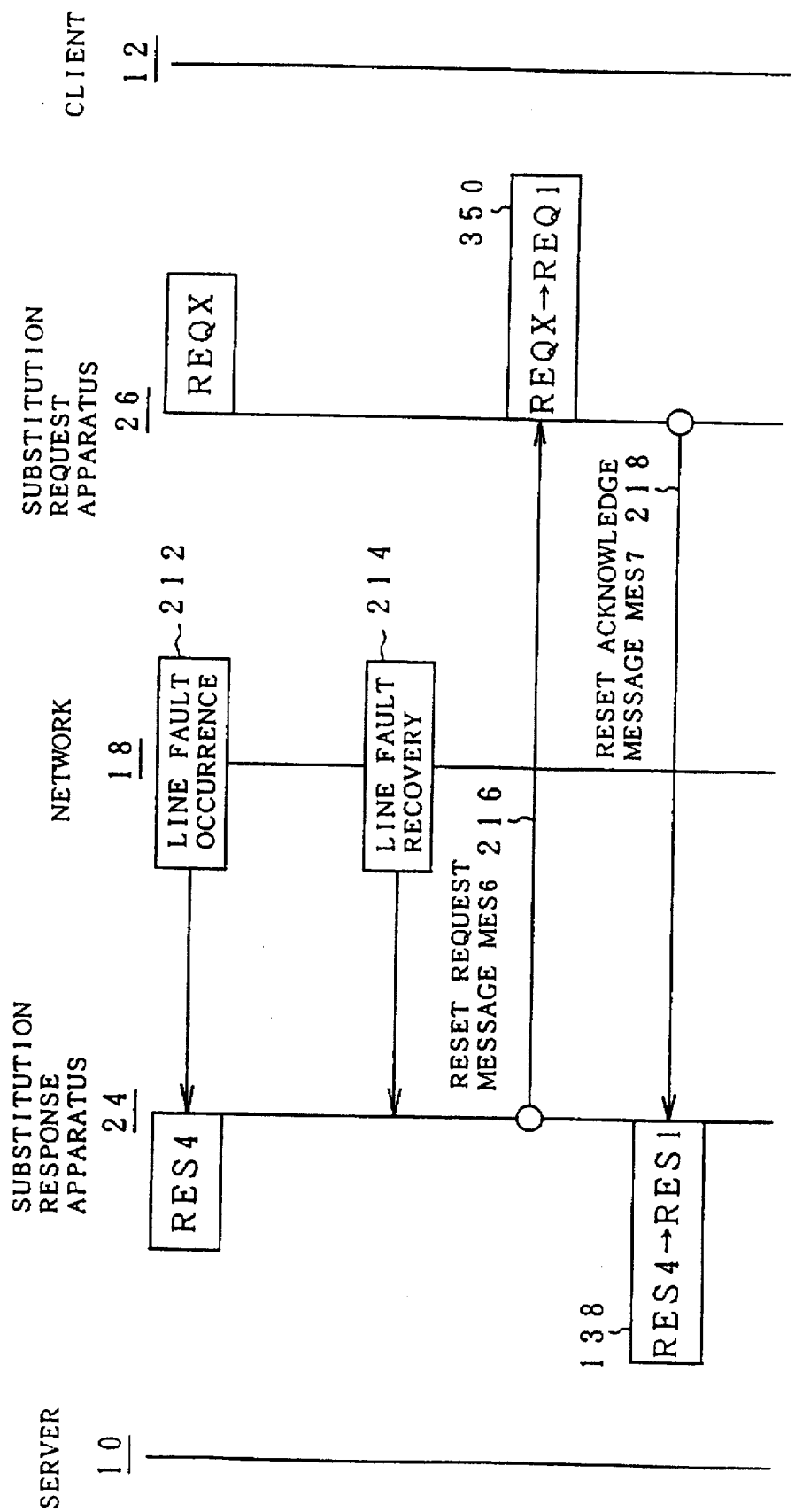
FIG. 25 is a time chart for a resetting process when a line fault recovery is detected on the substitution response side.

FIG. 25 shows a procedure for the sync control by a forced reset in a state in which the synchronization on the protocol cannot be obtained between the substitution response apparatus 24 and the substitution request apparatus 26 due to a fault in a state in which a line fault occurs on the network 18 and, after that, the line fault is recovered. When it is now assumed that there is a line fault occurrence 212 on the network 18 and it is detected by, for example, the substitution response apparatus 24, the mode is switched to the substitution response fault mode RES4. Subsequently, when a line fault recovery 214 is detected by the network 18, the substitution response apparatus 24 establishes a communication connection 216 for the substitution request apparatus 26 via the network 18 and transmits a reset request message MES6. The substitution request apparatus 26 is in an arbitrary operating mode REQX (where, X=1 to 3) in which the synchronization deviation occurs. When the reset request message MES6 is received from the substitution response apparatus 24 in the above state, an initializing process in which the operating mode is forcedly switched to the substitution request inoperating mode REQ1 by a switching operation 350 is executed. Subsequently, the substitution request apparatus 26 establishes a communication connection 218 for the substitution response apparatus 24 via the network 18 and transmits a reset acknowledge message MES7.

When the reset acknowledge message MES7 is received, the substitution response apparatus 24 is switched from the substitution response fault mode RES4 to the substitution response inoperating mode RES1 by a switching operation 138. Thus, the substitution response apparatus 24 is set into the substitution response inoperating mode RES1, the substitution request apparatus 26 is set into the substitution request inoperating mode REQ1, and the processing routine can advance to processes for the substitution response and substitution request which are synchronized with each other in response to a new polling request from the server unit 10.

Figure 26:
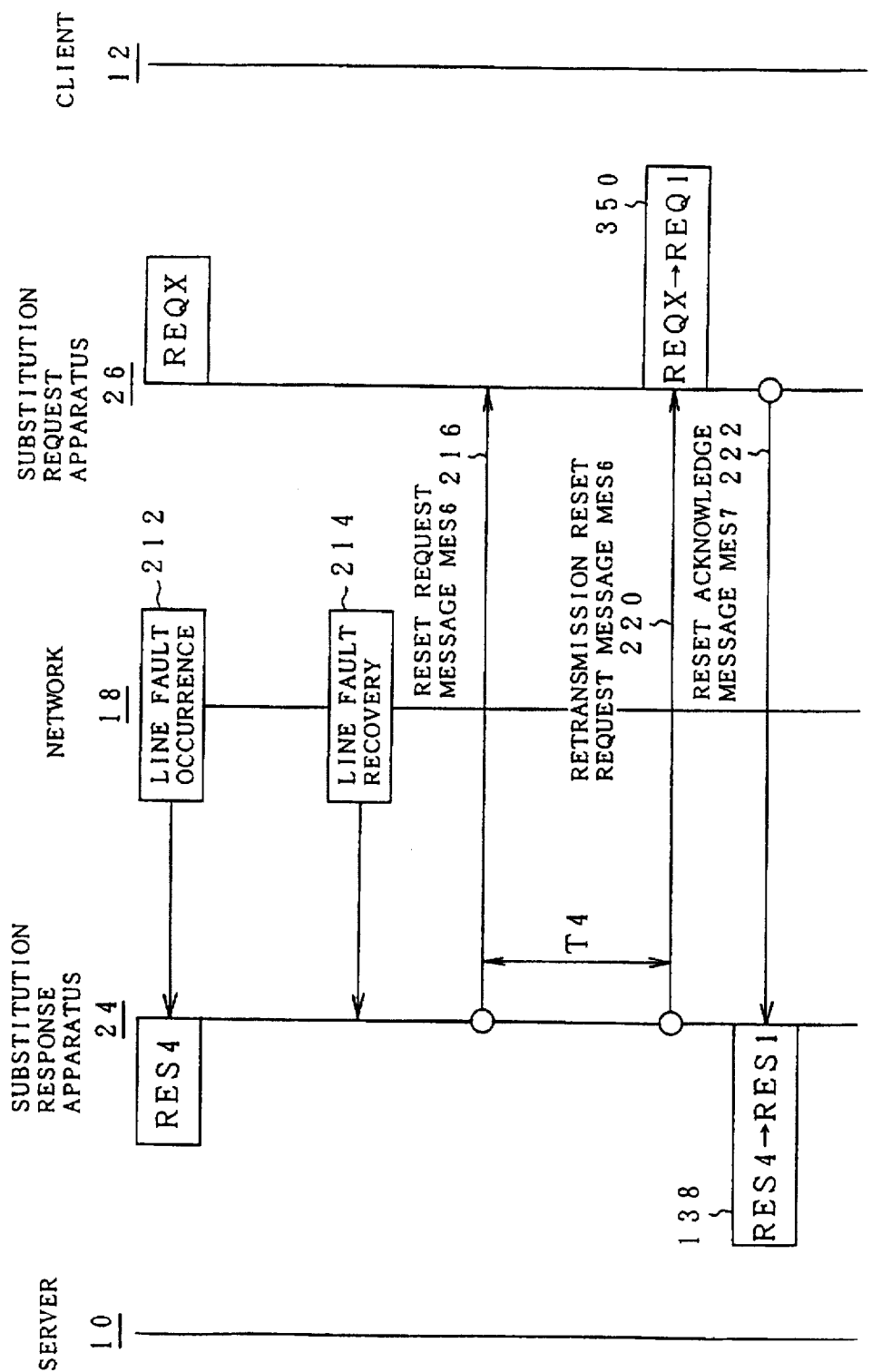
FIG. 26 is a time chart in the case where no reset response is obtained in FIG. 25.

FIG. 26 shows a procedure in the case where the reset acknowledge message MES7 is not transmitted from the substitution request apparatus 26 for the reset request message MES6 that was performed for the first time in FIG. 25. The substitution response apparatus 24 transmits the reset request message MES6 to the substitution request apparatus 26 by the establishment of the communication connection 216 and simultaneously starts the reset response waiting timer T4. For the first reset request message MES6, there is no response of the reset acknowledge message MES7 from the substitution request apparatus 26. Therefore, the substitution response apparatus 24 again establishes a communication connection 220 at the time point of the time-out of the timer T4 and transmits the retransmission reset request message MES6 to the substitution request apparatus 26. For the reset request message MES6, the substitution request apparatus 26 operates and is switched to the substitution request inoperating mode REQ1 by the switching operation 350. Subsequently, the reset acknowledge message MES7 is transmitted to the substitution response apparatus 24 by the establishment of a communication connection 222. The operating mode is switched to the substitution response inoperating mode RES1 by the switching operation 138.

Figure 27:
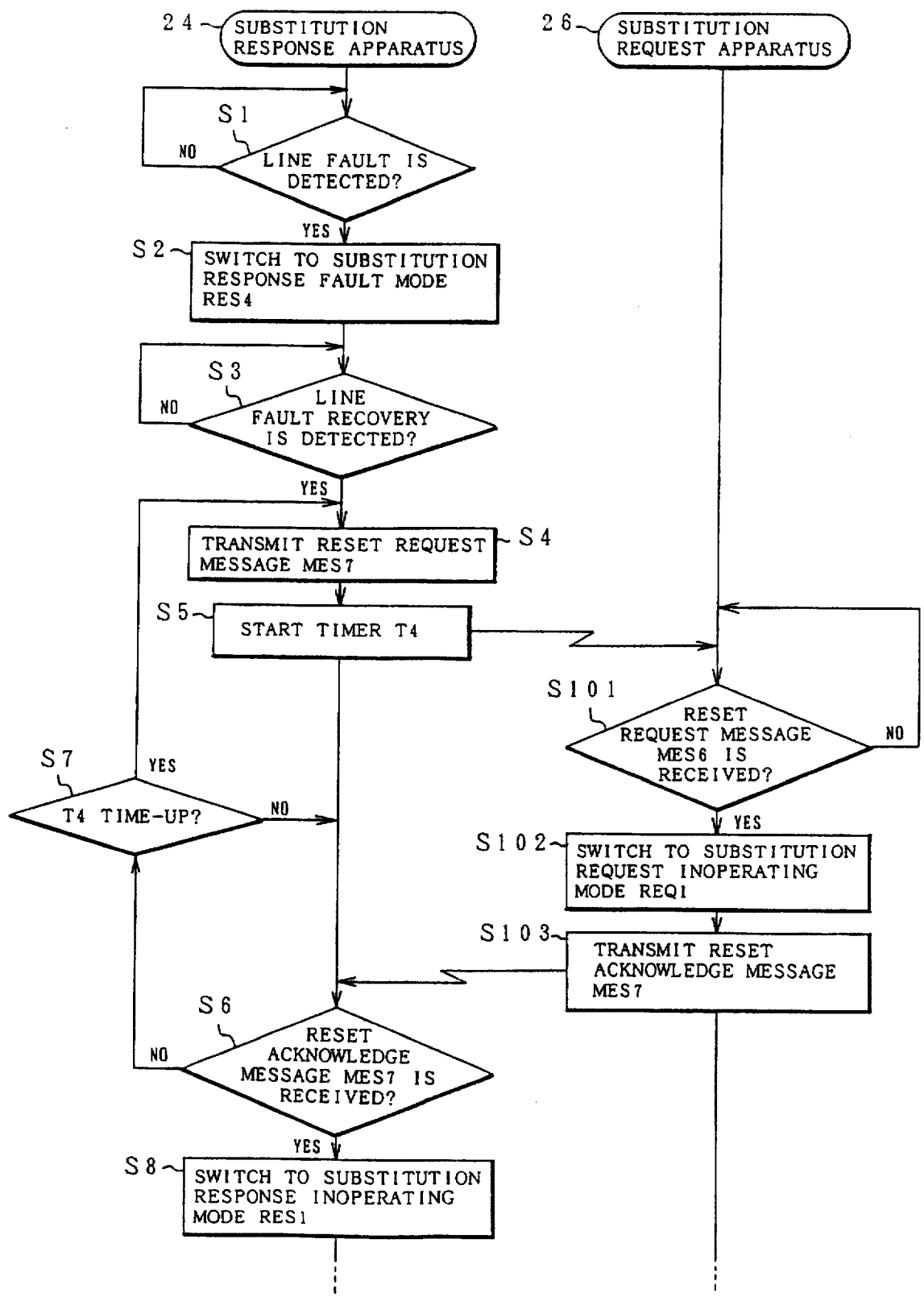
FIG. 27 is a flowchart for a resetting process in FIGS. 25 and 26.

A flowchart of FIG. 27 shows processing operations of the substitution response apparatus 24 and substitution request apparatus 26 for the synchronization deviation at the time of the recovery of a fault such as a line fault or the like in association with the time monitor by the timer T4 in FIG. 26. When the line fault is detected in step S1, the substitution response apparatus 24 is switched to the substitution response fault mode RES4 in step S2. In step S3, when the recovery of the line fault is detected in step S3, the reset request message MES6 is transmitted to the substitution request apparatus 26 in step S4. In step S5, the timer T4 is started at the same time. When receiving the reset request message MES6 transmitted from the substitution response apparatus 24 in step S101, the substitution request apparatus 26 advances to step S102 and is switched to the substitution request inoperating mode REQ1. In step S103, the reset acknowledge message MES7 is transmitted to the substitution response apparatus 24. When receiving the reset acknowledge message MES7 transmitted from the substitution request apparatus 26, the substitution response apparatus 24 advances to step S8 and is switched to the substitution response inoperating mode RES1. When the reset acknowledge message MES7 from the substitution request apparatus 26 is not received in step S6, step S7 follows and the time-out of the timer T4 is checked. When the timer T4 times out, step S4 follows and the reset request message MES6 is again transmitted to the substitution request apparatus 26.

Figure 28:
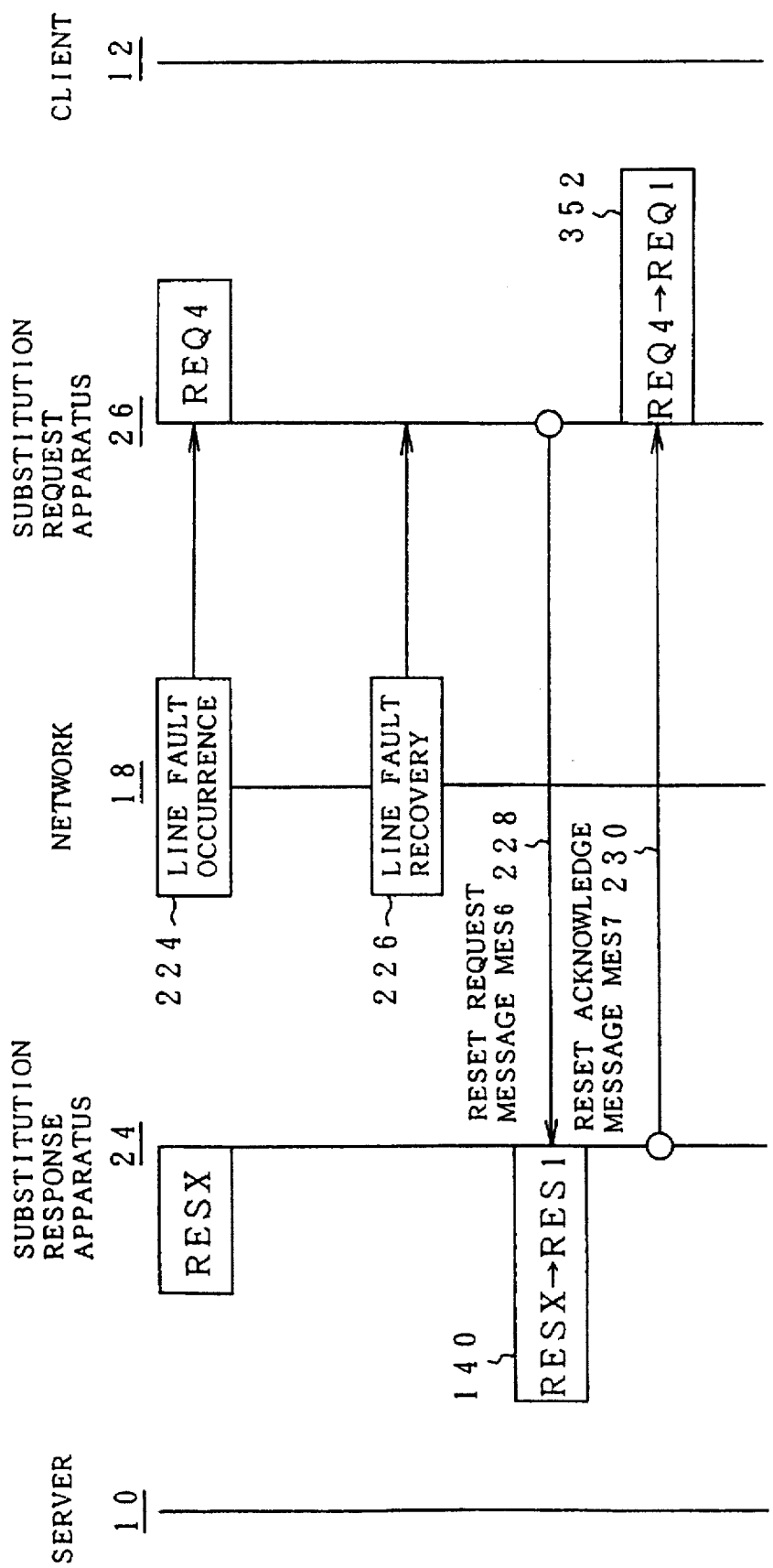
FIG. 28 is a time chart for a resetting process when the line fault recovery is detected on the substitution request side.

FIG. 28 shows a procedure for the resetting process for the synchronization deviation in the case where a line fault occurrence 224 and a line fault recovery 226 of the network 18 are detected on the substitution request apparatus 26 side. In this case, a communication connection 228 is established to the substitution response apparatus 24 from the substitution request apparatus 26 which detected the line fault recovery 226 and the reset request message MES6 is transmitted. The substitution response apparatus 24 is in an arbitrary operating mode RESX. As shown in a switching operation 140, when the reset request message MES6 is received, the operating mode is switched to the substitution response inoperating mode RES1. Subsequently, the substitution response apparatus 24 transmits the reset acknowledge message MES7 to the substitution request apparatus 26 by the establishment of a communication connection 230. When receiving the reset acknowledge message MES7, the substitution request apparatus 26 is switched to the substitution request inoperating mode REQ1 for the first time as shown in a switching operation 352.

Figure 29:
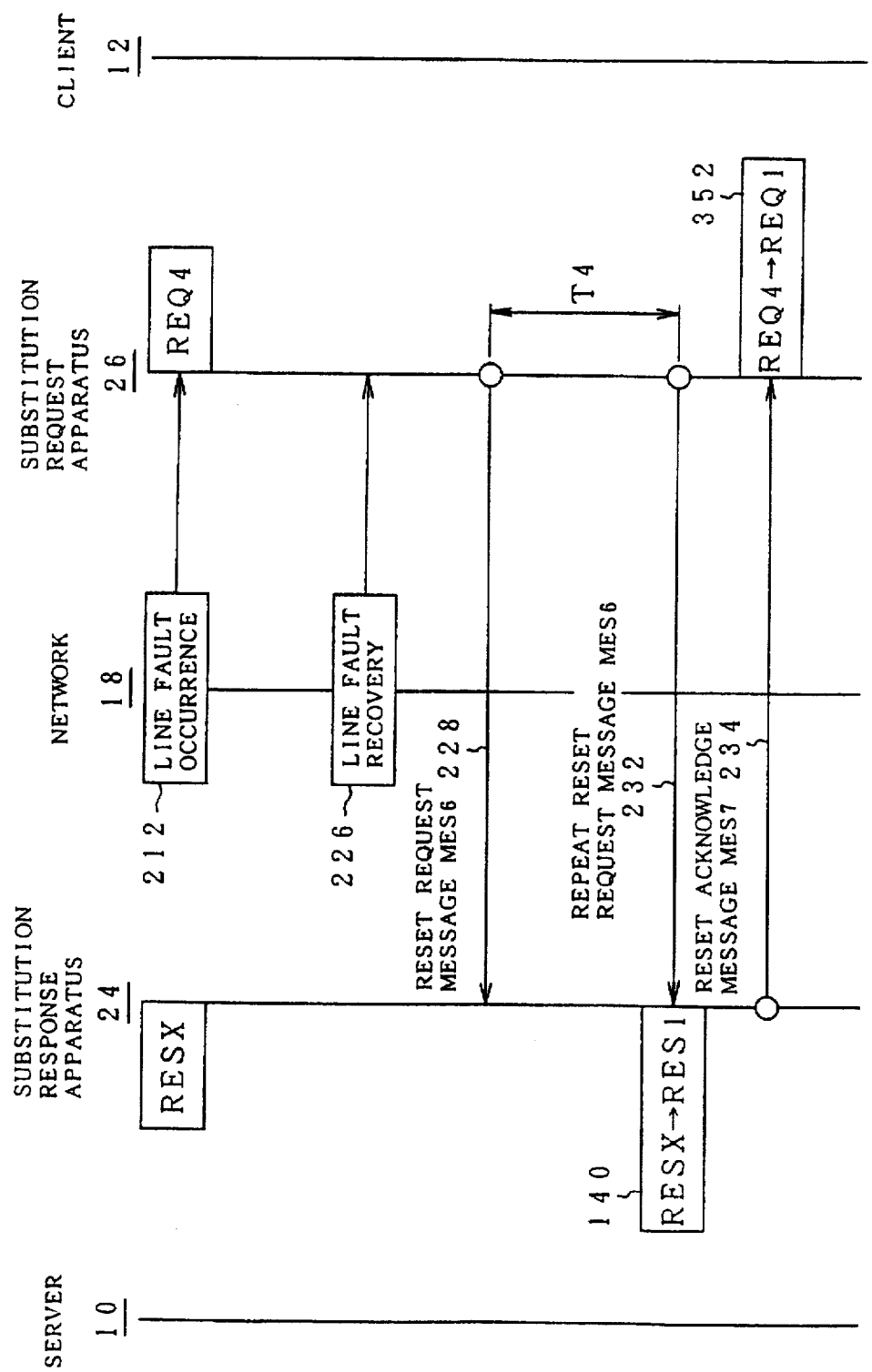
FIG. 29 is a time chart in the case where no reset response is obtained in FIG. 28.

A flowchart of FIG. 29 shows a procedure in the case where the resetting operation is not performed on the substitution response apparatus 24 side for the transmission of the first reset request message MES6 from the substitution request apparatus 26 and the reset acknowledge message MES7 is not transmitted. In this case, the timer T4 is activated simultaneously with the transmission by the establishment of the communication connection 228 of the reset request message MES6. When the timer T4 times out, a communication connection 232 is established and the retransmission reset request message MES6 is again transmitted to the substitution response apparatus 24. After the substitution response apparatus 24 was switched to the substitution response inoperating mode RES1 by the switching operation 140, the substitution response apparatus 24 establishes a communication connection 234, sends the reset acknowledge message MES7 to the substitution request apparatus 26, and is switched to the substitution request inoperating mode REQ1 by the switching operation 352.

Figure 30:
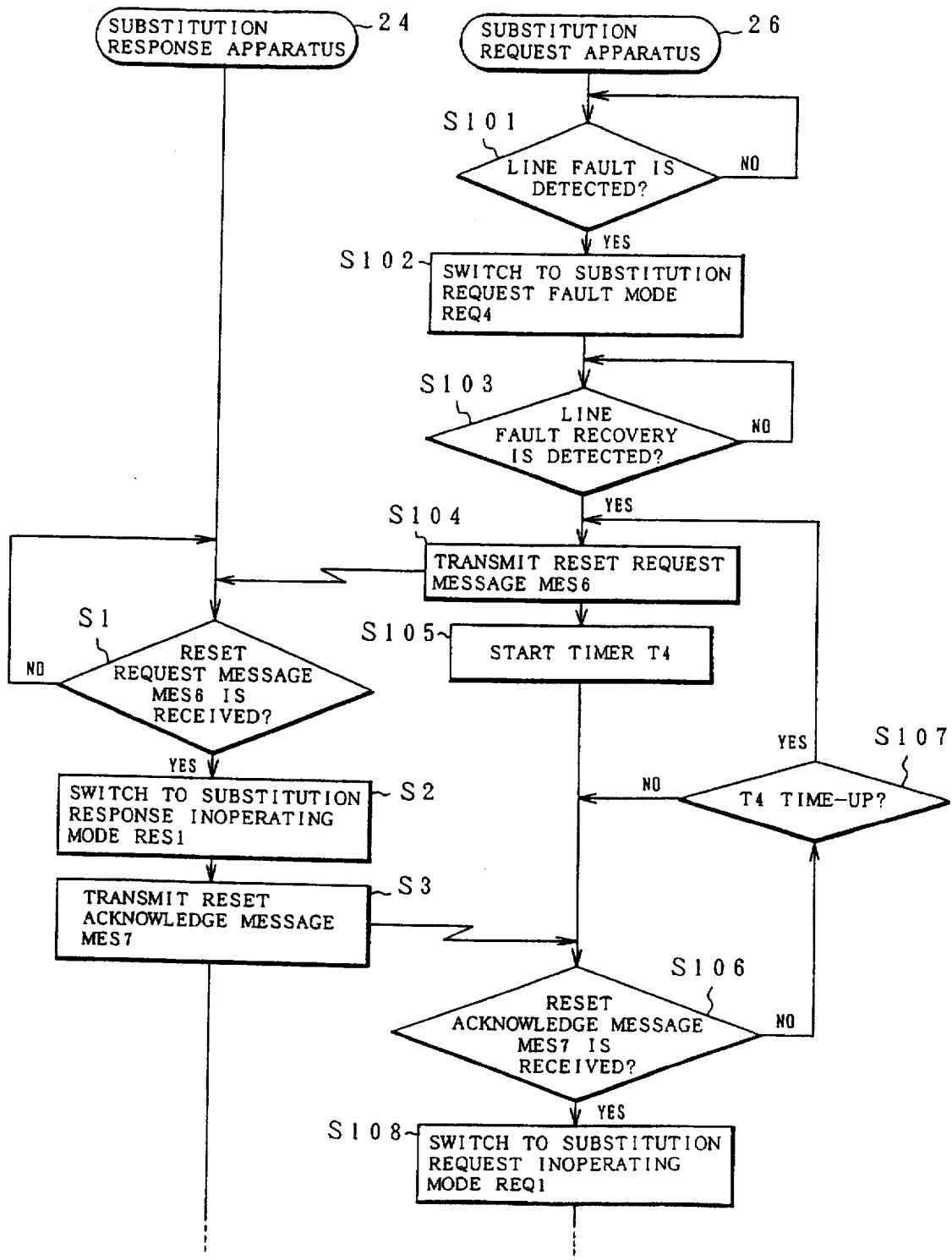
FIG. 30 is a flowchart for a resetting process in FIGS. 28 and 29.

A flowchart of FIG. 30 shows resetting processes for the synchronization deviation in the case where the occurrence of a line fault and the recovery of the line fault were detected on the substitution request apparatus 26 side in FIG. 29 with respect to the substitution response apparatus 24 and substitution request apparatus 26.

[Finishing Process for a Long-Time Polling]

Figure 31:
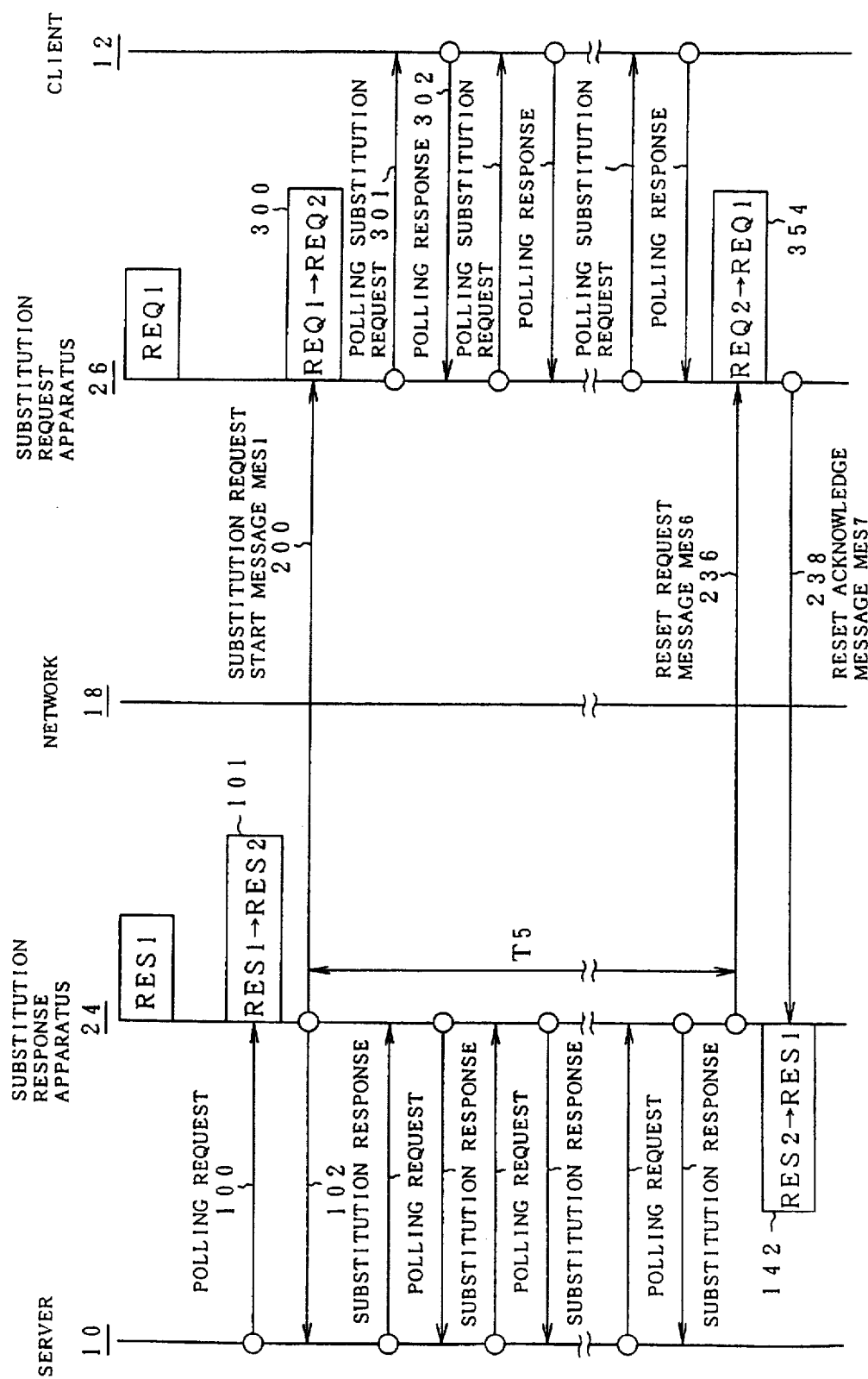
FIG. 31 is a time chart for an abnormal end process for a long-time polling.

FIG. 31 shows procedures for the finishing process when the polling request is performed from the server unit 10 to a specific client unit, for example, client unit 12-3 for a long time that is considered to be abnormal. The substitution response apparatus 24 is first in the substitution response inoperating mode RES1. When receiving the polling request 100 from the server unit 10, the substitution response apparatus 24 is first switched to the substitution response mode RES2 as shown in the switching operation 101. Thus, the substitution response 102 is transmitted for the polling request 100. After that, the substitution response is transmitted for a periodic polling request from the server unit 10. Simultaneously with the transmission of the substitution response 102, a communication connection is established for the substitution request apparatus 26 via the network 18. The substitution request start message MES1 is transmitted. The substitution request apparatus 26 is set to the substitution request mode REQ2 by the switching operation 300. Thus, the substitution request apparatus 26 transmits the polling substitution request 301. The polling response 302 is received from the client unit 12. Similar polling substitution request and polling response are repeated.

On the other hand, in the substitution response apparatus 24, the timer T5 to monitor an abnormality due to the long-time polling is monitored simultaneously with the transmission of the substitution request start message MES1 based on the first polling request 100. For example, one hour has been set into the timer T5. When the transmission of the substitution request start message MES1 or the reception of the substitution response restart message MES3 is again executed before the timer T5 times out, the timer T5 restarts. In the case where the transmission of the substitution request start message MES1 or the reception of the substitution response restart message MES3 is not again executed even after the elapse of a set time, for example, one hour of the timer T5, the substitution response apparatus 24 establishes a communication connection 236 with the substitution request apparatus 26 due to the time-out of the timer T5. The reset request message MES6 is transmitted. When the reset request message MES6 is received, the substitution request apparatus 26 advances to a substitution request inoperating mode REQ1 as shown in a switching operation 354. Subsequently, a communication connection 238 is established with the substitution response apparatus 24 via the network 18 and the reset acknowledge message MES7 is transmitted. When the reset acknowledge message MES7 is received, the substitution response apparatus 24 is switched to the substitution response inoperating mode RES1 through a switching operation 142.

Figure 32:
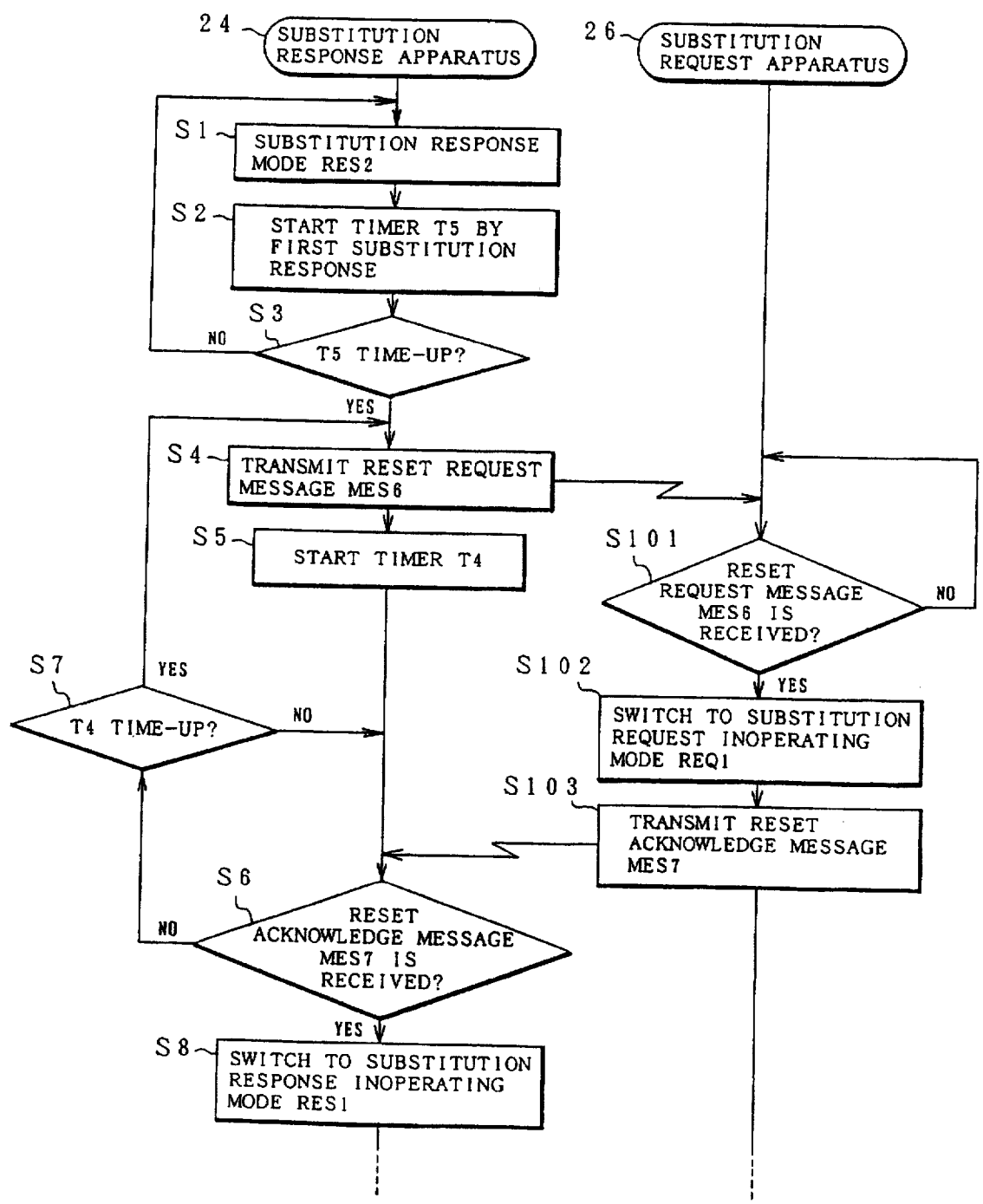
FIG. 32 is a flowchart for the abnormal end process in FIG. 31.

A flowchart of FIG. 32 shows the processing operations of the substitution response apparatus 24 and substitution request apparatus 26 for executing a finishing process for the long-time polling in FIG. 31. After the substitution response apparatus 24 was shifted to the substitution response mode RES2 in step S1, the timer T5 to monitor the long-time polling is started synchronously with the first substitution response, namely, with the transmission of the substitution request start message MES1 in step S2. In the case where the substitution response to the polling request continues without shifting to the substitution response inoperating mode RES1 or to the substitution response stop mode RES3 at all, so long as the time-out of the timer T5 is judged in step S3, the substitution response apparatus 24 transmits the reset request message MES6 to the substitution request apparatus 26 in step S4. Although not shown in FIG. 32, even in this case, the timer T4 is started in a manner similar to the cases of FIGS. 26 and 29.

When the reset request message MES6 from the substitution response apparatus 24 is received in step S101, the substitution request apparatus 26 is switched to the substitution request inoperating mode REQ1 in step S102. In step S103, the reset acknowledge message MES7 is transmitted to the substitution response apparatus 24. When the reset acknowledge message MES7 is received in step S6, the substitution response apparatus 24 is switched to the substitution response inoperating mode RES1 in step S8. When the time-out of the timer T4 is judged in step S7 without receiving the reset acknowledge message MES7, the processing routine is returned to step S4 and the reset request message MES6 is again transmitted to the substitution request apparatus 26.

Figure 34:
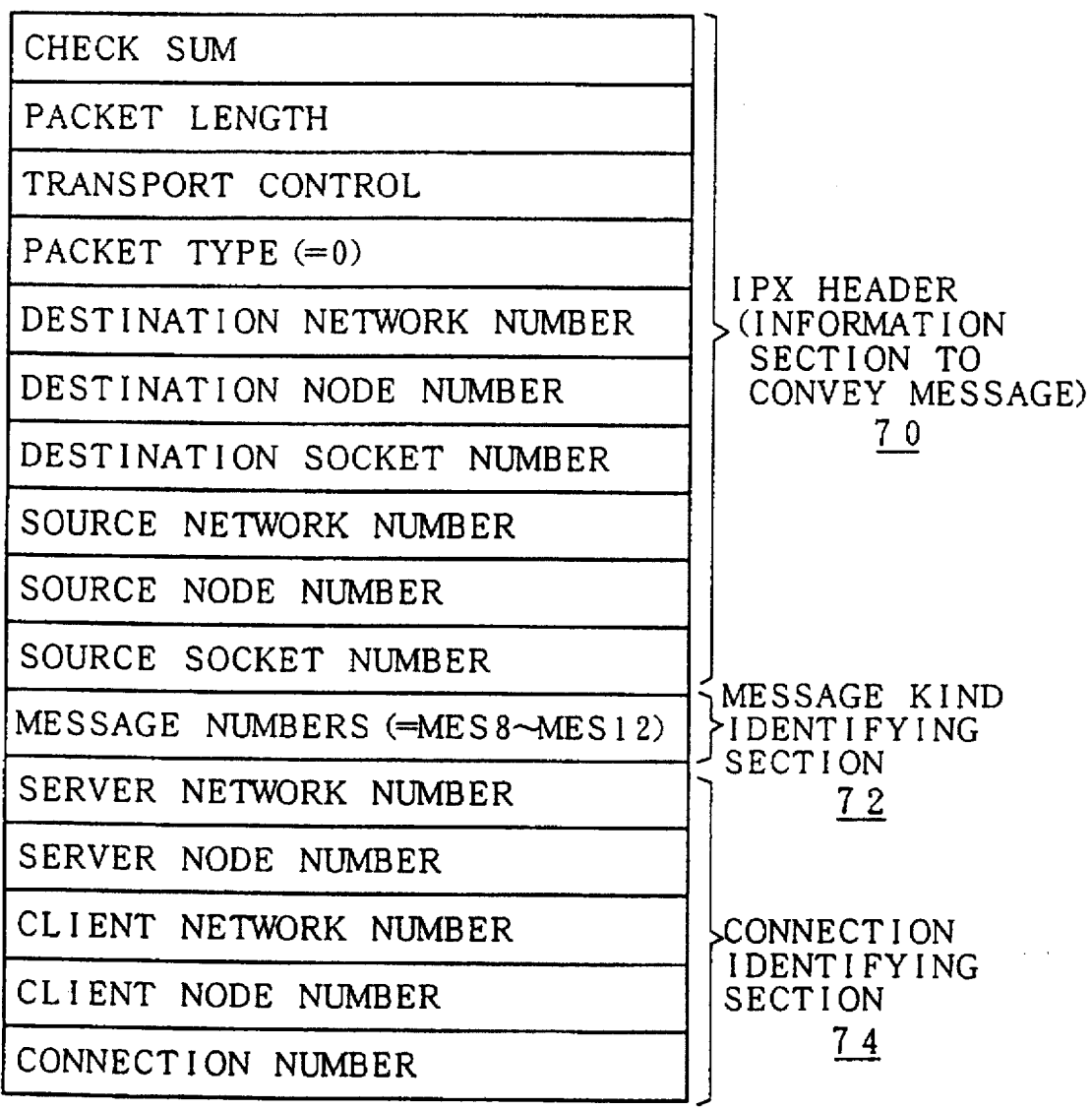
FIG. 34 is an explanatory diagram of a format of the response messages in FIG. 33.

In the embodiment, although the reset acknowledge message MES7 is provided only for the reset request message MES6, acknowledge messages MES8 to MES12 in FIG. 33 can be also provided with respect to the other messages in FIG. 9. For example, when considering an IPX header of a Net Ware communication protocol, as shown in FIG. 34, a format of each of the acknowledge messages MES8 to MES12 is constructed by the information section 70 for conveying a message, a message kind identifying section 72, and a connection identifying section 74. Either one of the acknowledge message numbers MES8 to MES12 is selectively set into the message kind identifying section 72.

[Expansion of Applying System]

Figure 35:
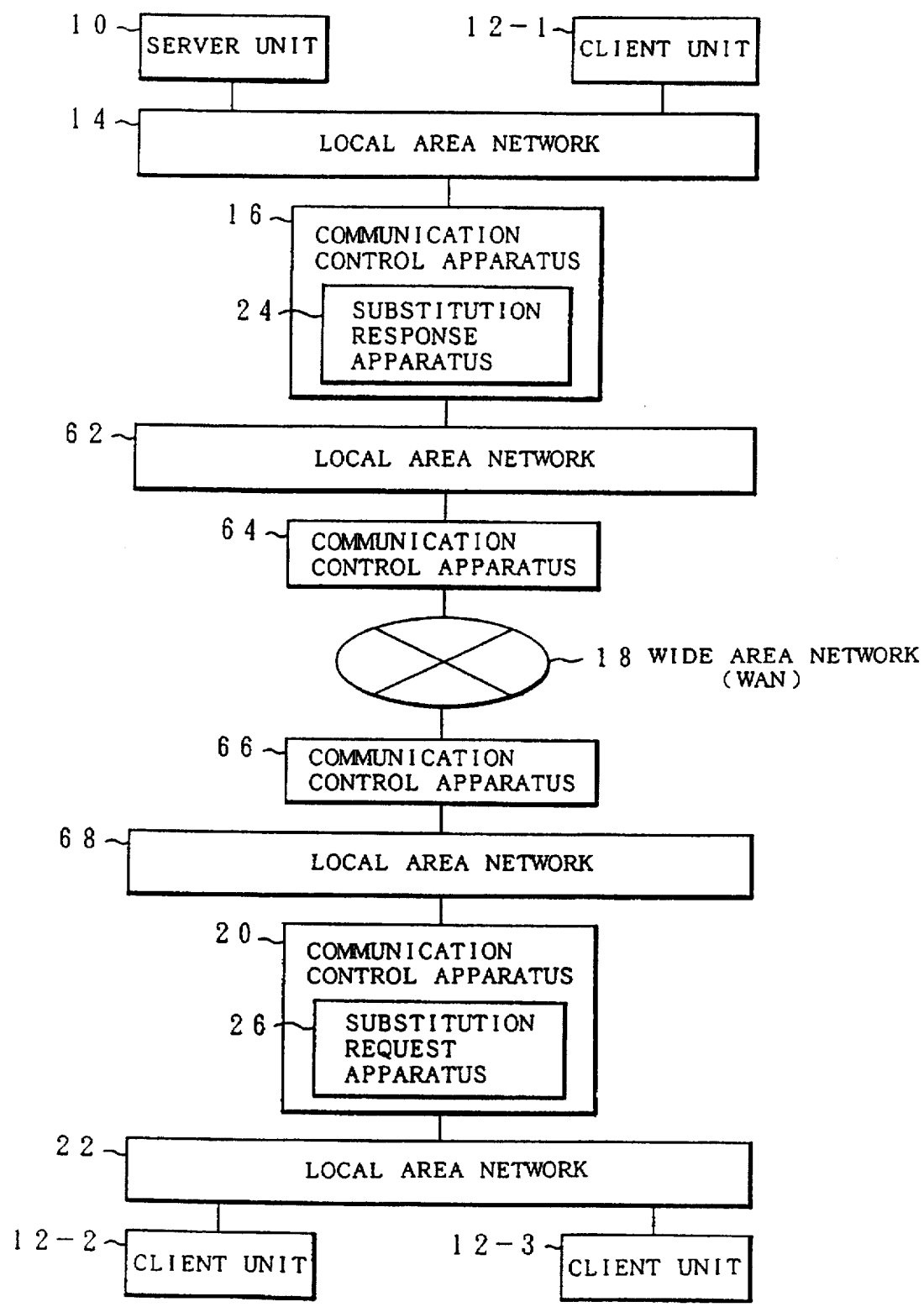
FIG. 35 is an explanatory diagram of an expansion system to which the invention is applied.

FIG. 35 shows another embodiment of a server client system to which the polling substitution system of the invention is applied. In the embodiment, the system has a configuration such that another local area network for no-charge or fixed charge intervenes between the wide area network 18 and the communication control apparatuses 16 and 20. Namely, the server unit 10 and client unit 12-1 are connected to the local area network 14. The local area network (first network) 14 is connected to another local area network (second network) 62 through the communication control apparatus (first communication control section) 16 having the substitution response apparatus 24. A proper processing unit is connected to the local area network 62. The local area network 62 is connected to the wide area network 18 via a communication control apparatus (third communication control section) 64. The local area network (fourth network) 22 to which the client units 12-2 and 12-3 which can access to the server unit 10 are connected is connected to another local area network (third network) 68 via the communication control apparatus (second communication control section) 20 having the substitution request apparatus 26. The local area network 68 is connected to the wide area network 18 via a communication control apparatus (fourth communication control section) 66. The substitution response apparatus 24 of the communication control apparatus 16 and the substitution request apparatus 26 of the communication control apparatus 20 transmit and receive various control messages for sync control to a compound network in which (the local area network 62 and communication control apparatus 64) and (the local area network 68 and communication control apparatus 66) are further included in the wide area network 18 so as not to directly supply the polling request message and polling response message.

Figure 36:
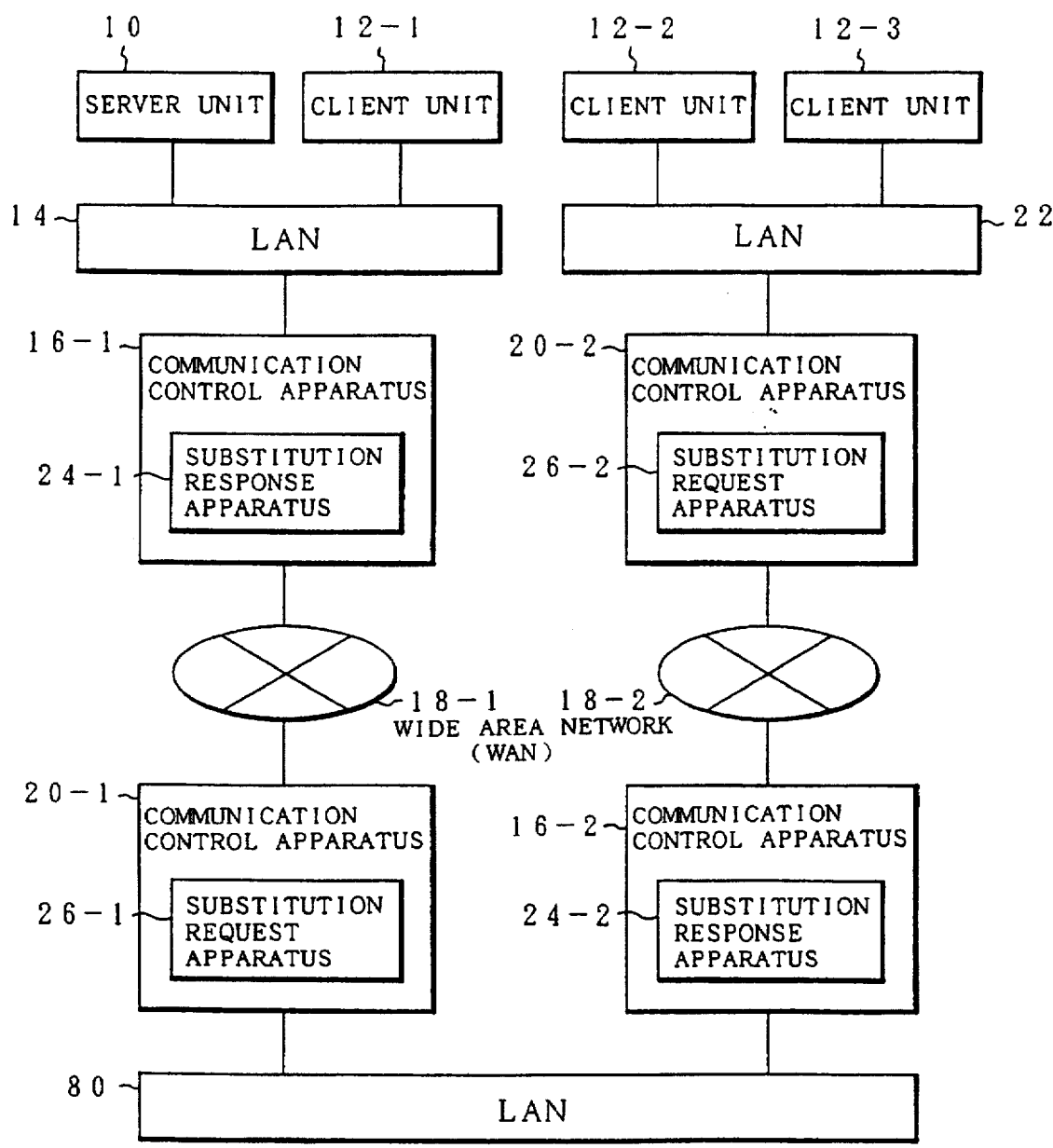
FIG. 36 is an explanatory diagram of an expansion system in case of intervening two networks.

FIG. 36 shows an expanded system configuration to obtain a polling response by performing a polling request from the server unit to the client unit via two wide area networks each having a charging form. The server unit 10 and client unit 12-1 of the local area network 14 are connected to a wide area network 18-1 through a communication control apparatus 16-1 having a substitution response apparatus 24-1. A communication control apparatus 20-1 having a substitution request apparatus 26-1 on the polling request destination side of the network 18-1 is connected to the communication control apparatus 16-1. On the other hand, a communication control apparatus 16-2 having a substitution response apparatus 24-2 is connected to the polling request side of a next wide area network 18-2. The communication control apparatus 16-2 is connected to the communication control apparatus 20-1 on the wide area network 18-1 side through a local area network 80. Further, the client units 12-2 and 12-3 of network 22 are network 22 are connected to the wide area network 18-2 through a communication control apparatus 20-2 having a substitution request apparatus 26-2. The polling request from the server unit 10 is supplied to the substitution response apparatus 24-1 of the communication control apparatus 16-1 and the substitution response to the server unit 10 is performed. At the same time, a communication connection is established to the wide area network 18-1. Various control messages in FIG. 9 which are necessary for sync control of the substituting process are transmitted and received to/from the substitution request apparatus 26-1 of the communication control apparatus. Processes shown with respect to the substitution response apparatus 24 and substitution request apparatus 26 in FIG. 1 such as synchronization and the like for the start, stop, end, restart, and fault recovery of the polling substituting process are executed. Further, the substitution request apparatus 26-1 of the communication control apparatus 20-1 performs the polling substitution request to the substitution response apparatus 24-2 of the communication control apparatus 16-2 via the local area network 80. When seeing from the substitution response apparatus 24-2, the substitution request apparatus 26-1 can be regarded as a unit that is equivalent to the server unit 10 for the substitution response apparatus 24-1. The substitution response apparatus 24-2 transmits and receives various control messages necessary for sync control in FIG. 9 to/from the substitution request apparatus 26-2 by the establishment of the communication connection via the wide area network 18-2, thereby executing a series of processes such as synchronization and the like for the start, stop, and end of the polling request and the fault recovery of the network. Thus, the polling request message and polling response message are not directly supplied to any one of the wide area networks 18-1 and 18-2 each having the charging form according to the communication time and communication amount. It is sufficient to communicate the sync control messages of the least limit amount necessary for the sync control of the substitution response and substitution request. Therefore, an advantageous result on charging can be also obtained with regard to the polling process via the wide area networks 18-1 and 18-2.

The above embodiments have been described with respect to the polling substituting processes via the networks between the server unit and one or a plurality of client units. However, the polling substitution system of the invention can be also similarly applied to another polling process by the host computer in the case where terminal units are connected to the host computer via the network having a charging form. The present invention is not limited by the numerical values of the embodiments.

What is claimed is:

1. A polling substitution system comprising:

a network for performing a communication;

a shared unit for holding information resources, for assuring a use of the information resources in accordance with a request from outside said shared unit, and in the case where a polling request to confirm an operation is transmitted to a using side of said information resources and no response is obtained therefrom, for further releasing the information resources assured for said using side;

a processing unit using the information resources of said shared unit via said network;

a first communication control section for connecting said shared unit to said network, thereby establishing a communication connection with another unit including said processing unit on the basis of a communication request;

a second communication control section for connecting said processing unit to said network, thereby establishing a communication connection with another unit including said shared unit on the basis of the communication request;

a substitution response section, provided for said first communication control section, for processing a substitution response to the polling request from said shared unit on the basis of an exchange of a sync control message between said substitution response section and said second communication control section on said processing unit side via said network; and a substitution request section, provided for said second communication control section, for processing a polling substitution request to said processing unit on the basis of an exchange of the sync control message between said substitution request section and said substitution response section via said network.

2. A system according to claim 1, wherein when the polling request is received from said shared unit, said substitution response section transmits a substitution request start message to said substitution request section via said network and starts the transmission of said polling substitution response to said shared unit, and when said substitution request start message is received from said substitution response section, said substitution request section starts the transmission of the polling substitution request to said processing unit.

3. A system according to claim 2, wherein after the start of the polling substitution response, said substitution response section returns the polling substitution response each time the polling request is received from said shared unit, and after the start of the polling substitution request, said substitution request section periodically transmits the polling substitution request so long as the polling response is received from said processing unit.

4. A system according to claim 3, wherein said substitution request section repeats processes such that an elapsed time after the polling substitution request was transmitted to said processing unit is monitored and, in the case where said monitor time exceeds a predetermined time, the polling substitution request is again transmitted and an elapsed time is again monitored.

5. A system according to claim 2, wherein said substitution request section monitors an elapsed time from the transmission of the polling substitution request to the reception of the polling response from said processing unit and, in the case where said elapsed time exceeds a predetermined time, it is judged that the operation of said processing unit is finished, so that said substitution request section transmits a substitution response stop message to said substitution response section via said network, and in the case where said substitution response stop message is received via said network, said substitution response section temporarily stops the transmission of the substitution response to the polling request from said shared unit.

6. A system according to claim 5, wherein after said substitution response stop message was transmitted, in the case where the polling response is received from said processing unit, said substitution request section transmits a substitution response restart message to said substitution response section via said network, and after the polling substitution response to said shared unit was stopped, in the case where said substitution response restart message is received via said network, said substitution response section restarts a substitution response to the polling request from said shared unit.

7. A system according to claim 5, wherein after it was judged that the operation of said processing unit was finished, said substitution request section transmits the polling substitution request and monitors an elapsed time of the polling response from said processing unit and, in the case where said monitor time exceeds a predetermined time, said substitution request section stops the transmission of the polling substitution request to said processing unit and transmits a substitution response end message to said substitution response section via said network, and in the case where said substitution response end message is received via said network in a state in which the substitution response to the polling request from said shared unit is temporarily stopped, said substitution response section finishes the polling substituting process.

8. A system according to claim 2, wherein said substitution response section monitors an elapsed time from the reception of the last polling request to the reception of the next new polling request from said shared unit and, in the case where said elapsed time exceeds a predetermined time, it is judged that said polling request is stopped, and said substitution response section transmits a substitution request end message to said substitution request section via said network, and in the case where said substitution request end message is received via said network during a process of the substitution request, said substitution request section finishes the polling substitution request to said processing unit.

9. A system according to claim 2, wherein after an occurrence of a fault of the network was detected, in the case where a fault recovery is detected, said substitution response section transmits a reset request message to said substitution request section via said network, and in the case where said reset request message is received from said substitution response section via said network, after completion of an initialization of a substitution requesting operation, said substitution request section transmits a reset acknowledge message to said substitution response section via said network, thereby initializing a substitution responding operation of said substitution response section.

10. A system according to claim 9, wherein said substitution response section monitors an elapsed time from the transmission of said reset request message to the reception of said reset acknowledge message and, in the case where said elapsed time exceeds a predetermined time, said substitution response section again transmits said reset request message.

11. A system according to claim 2, wherein after an occurrence of a fault of the network was detected, in the case where a fault recovery is detected, said substitution request section transmits a reset request message to said substitution response section via said network, and in the case where said reset request message is received from said substitution request section via said network, after completion of an initialization of a substitution responding operation, said substitution response section transmits a reset acknowledge message to said substitution request section via said network, thereby initializing a substitution requesting operation of said substitution request section.

12. A system according to claim 11, wherein said substitution request section monitors an elapsed time from the transmission of said reset request message to the reception of said reset acknowledge message and, in the case where said elapsed time exceeds a predetermined time, said substitution request section again transmits said reset request message.

13. A system according to claim 2, wherein said substitution response section monitors a time of the polling request that is repetitively executed for a specific client side of said shared unit and, in the case where said monitor time exceeds a predetermined time, said substitution response section transmits the reset request message to said substitution request section via said network, and in the case where said reset request message is received from said substitution response section via said network, after completion of an initialization of a substitution requesting operation, said substitution request section transmits a reset acknowledge message to said substitution response section via said network, thereby initializing a substitution response operation of said substitution response section.

14. A system according to claim 13, wherein said substitution response section monitors an elapsed time from the transmission of said reset request message to the reception of said reset acknowledge message and, in the case where said elapsed time exceeds a predetermined time, said substitution response section again transmits said reset request message.

15. A system according to claim 1, wherein said substitution request section transmits an acknowledge messages for the reception of each of the messages.

16. A system according to claim 1, wherein said substitution response section transmits said acknowledge message for the reception of each of said messages.

17. A system according to claim 1, wherein said network executes a charging in accordance with a use degree of a communication.

18. A system according to claim 1, wherein said first communication control section having said substitution response section connects a network of a no-charge or fixed charge having said shared unit to said network, and said second communication control section having said substitution request section connects another network of a no-charge or fixed charge having said processing unit to said network.

19. A system according to claim 1, wherein said first communication control section having said substitution response section connects a first network of a no-charge or fixed charge having said shared unit to a second network of likewise a no-charge or fixed charge, a third communication control section connects said second network to said network for charging in accordance with a use degree of a communication, a fourth communication control section connects said network to a third network of a no-charge or fixed charge, and said second communication control section having said substitution request section connects another fourth network of a no-charge or fixed charge having said processing unit to said third network.

20. A system according to claim 1, wherein said shared unit and said processing unit are connected via a plurality of said networks, the first communication control section having said substitution response section is provided on the shared unit side of each network, and the second communication control section having said substitution request section is provided on the processing unit side of each network.

21. A system according to claim 1, wherein said shared unit is a server unit, and said processing unit is a client unit.

* * * * *